United States Patent
Kim et al.

(10) Patent No.: US 7,150,532 B2
(45) Date of Patent: *Dec. 19, 2006

(54) PROJECTION SYSTEM WITH SCROLLING UNIT

(75) Inventors: Sung-ha Kim, Seoul (KR); Kun-ho Cho, Suwon-si (KR); Dae-sik Kim, Suwon-si (KR); Hee-joong Lee, Anyang-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 10/801,138

(22) Filed: Mar. 16, 2004

(65) Prior Publication Data

US 2004/0263789 A1    Dec. 30, 2004

Related U.S. Application Data

(60) Provisional application No. 60/457,569, filed on Mar. 27, 2003.

(30) Foreign Application Priority Data

Apr. 16, 2003  (KR)  ............... 10-2003-0023976

(51) Int. Cl.
  *G03B 21/14* (2006.01)
  *G02F 1/1335* (2006.01)
  *G02F 1/13363* (2006.01)
  *H04N 9/14* (2006.01)

(52) U.S. Cl. ............... 353/20; 353/33; 353/31; 349/9; 349/62; 348/742; 348/762

(58) Field of Classification Search ............ 353/33, 353/20, 81, 82, 98, 99, 31, 84; 349/7–9, 349/57, 62; 359/487, 483, 494–497, 500, 359/891, 892; 348/742, 743; H04N 9/14
See application file for complete search history.

(56) References Cited

U.S. PATENT DOCUMENTS

| | | | | |
|---|---|---|---|---|
| 2,811,077 A | * | 10/1957 | Wiemer et al. | ............... 353/8 |
| 5,042,921 A | * | 8/1991 | Sato et al. | ............... 349/9 |
| 6,122,103 A | | 9/2000 | Perkins et al. | |
| 6,288,815 B1 | * | 9/2001 | Lambert | ............... 359/196 |

(Continued)

FOREIGN PATENT DOCUMENTS

EP    1 093 304 A2    4/2001

(Continued)

*Primary Examiner*—W. B. Perkey
*Assistant Examiner*—Andrew Sever
(74) *Attorney, Agent, or Firm*—Sughrue Mion, PLLC

(57) ABSTRACT

A projection system including a light source, a polarization conversion system, a reflection mirror, a color separator, a scrolling unit, a light valve, and a projection lens unit is provided. The polarization conversion system includes an incidence plane through which light emitted from the light source enters, and transmits a beam with a first polarization from the light entering through the incidence plane and reflects a beam with a second polarization toward the incidence plane and then changes the polarization of the reflected beam. The reflection mirror reflects the light emitted from the polarization conversion system through the incidence plane back toward the incidence plane. The color separator separates an incident beam according to color. The scrolling unit scrolls the color beams. The light valve processes an incident beam according to an image signal and forms a color picture. The projection lens unit magnifies and projects the color picture onto a screen.

26 Claims, 16 Drawing Sheets

U.S. PATENT DOCUMENTS

| | | | |
|---|---|---|---|
| 6,877,865 B1 * | 4/2005 | English et al. ................. | 353/97 |
| 6,921,171 B1 * | 7/2005 | Lee et al. ..................... | 353/31 |
| 2001/0038483 A1 | 11/2001 | Lambert | |
| 2002/0080304 A1 | 6/2002 | Ho et al. | |
| 2002/0191154 A1 | 12/2002 | Shahzad et al. | |

FOREIGN PATENT DOCUMENTS

| | | |
|---|---|---|
| EP | 1 253 787 A2 | 10/2002 |
| JP | 11-281930 A | 10/1999 |
| KR | 1999-002347 A | 1/1999 |

* cited by examiner

PROJECTION SYSTEM WITH SCROLLING UNIT

This application claims the benefits of Korean Patent Application No. 2003-23976, filed on Apr. 16, 2003, in the Korean Intellectual Property Office, and U.S. Patent Provisional Application No. 60/457,569, filed on Mar. 27, 2003, in the U.S. Patent Trademark Office, the disclosures of which are incorporated herein in their entireties by reference.

BACKGROUND OF THE INVENTION

1. Field of the Invention

An apparatus consistent with the present invention relates to a projection system and, more particularly, to a highly efficient projection system with an increased light efficiency which maximally uses light emitted from a light source and is made compact by using a single scrolling unit to scroll color bars.

2. Description of the Related Art

In a conventional projection system, a light valve, such as a liquid crystal display (LCD) or a Digital Micro-mirror Device (DMD), controls the on/off operation of light emitted from a light source on a pixel-by-pixel basis and forms a picture, and a magnifying projection optical system enlarges the picture to be displayed on a large screen.

Projection systems are classified into 3-panel projection systems or single-panel projection systems according to the number of light valves that are used. A 3-panel projection system provides better light efficiency than a single-panel projection system but is more complicated and expensive than the single-panel projection system. The single-panel projection system can include a smaller optical system than the three-panel projection system but provides only ⅓ of the light efficiency of the three-panel projection systems because red (R), green (G), and blue (B) colors, into which white light is separated, are sequentially used. More specifically, in the single-panel projection system, white light radiated from a white light source is separated into three color beams, namely, R, G, and B color beams, using color filters, and the three color beams are sequentially sent to a light valve. The light valve operates according to the sequence of color beams received to create images. Since the single-panel projection system sequentially uses color beams, the light efficiency is reduced to ⅓ of the light efficiency of a three-panel projection system.

A color scrolling method has been recently developed in which the light efficiency of the single-panel projection system is increased. In the color scrolling method, R, G, and B beams, into which white light is separated, are simultaneously sent to different locations on a light valve. Since an image cannot be produced until all of the R, G, and B beams reach each pixel of the light valve, the R, G, and B color beams are moved at a constant speed by a color scrolling means.

FIG. 1 is a schematic diagram of a single-panel scrolling projection system disclosed in U.S. Publication No. 2002/191154 A1. Referring to FIG. 1, white light emitted from a light source 100 passes through first and second lens arrays 102 and 104, a polarization conversion system (PCS) 105, and a condenser lens 107, and is separated into R, G, and B color beams by first through fourth dichroic filters 109, 112, 122, and 139. More specifically, the red beam R and the green beam G, for example, pass through the first dichroic filter 109 and travel along a first light path $L_1$, while the blue beam B is reflected by the first dichroic filter 109 and travels along a second light path $L_2$. The red beam R and the green beam G on the first light path $L_1$ are separated by the second dichroic filter 112. The red beam R continues along the first light path $L_1$, passing through the second dichroic filter 112, and the second dichroic filter 112 reflects the green beam G along a third light path $L_3$.

The red, blue, and green beams R, B, and G are scrolled while passing through first through third prisms 114, 135, and 142, respectively. The first through third prisms 114, 135 and 142 are disposed in the first through third light paths $L_1$, $L_2$, and $L_3$, respectively, and as the first, second, and third prisms 114, 135, and 142 rotate at a uniform speed, R, B, and G color bars are properly scrolled. The blue and green beams B and G, which travel along the second and third light paths $L_2$ and $L_3$, respectively, are transmitted and reflected by the third dichroic filter 139, respectively, and combined. The red, green, and blue beams R, G, and B are then combined by the fourth dichroic filter 122. The combined beam is transmitted by a polarization beam splitter (PBS) 127 and forms a picture using a light valve 130.

The scrolling of the R, G, and B color bars due to rotation of the first through third prisms 114, 135, and 142 is illustrated in FIG. 2. Scrolling represents the movement of color bars formed on the surface of the light valve 130 when the first, second, and third prisms 114, 135, and 142 corresponding to R, B, and G colors, respectively, are synchronously rotated.

A color image obtained by turning the pixels of the light valve 130 on or off according to an image signal is magnified by a projection lens (not shown) and projected onto a screen.

Since the conventional projection system uses different light paths for different colors, a light path correction lens must be included for each of the colors, components for unifying the separated light beams must be further included, and separate components must be included for each of the colors. Hence, the conventional optical system is bulky, and the manufacturing and assembly thereof is complicated, thus decreasing the yield.

Three motors for rotating the first, second, and third scrolling prisms 114, 135, and 142 generate much noise during operation. Thus, the projection system adopting three motors is manufactured at a greater cost than a color wheel type projection system which utilizes a single motor.

In order to produce a color picture using a scrolling technique, color bars as shown in FIG. 2 must be scrolled at a constant speed. Hence, the conventional projection system must synchronize the light valve 130 with the three prisms 114, 135, and 142 in order to achieve proper scrolling. However, controlling the synchronization is not easy. Due to the circular motion of the scrolling prisms 114, 135, and 142, the color scrolling speed by the three scrolling prisms is irregular, consequently deteriorating the quality of the resultant image.

FIG. 3 is a schematic diagram of an illumination system included in the conventional projection system of FIG. 1. Referring to FIG. 3, an unpolarized beam is radiated from a lamp 111 of the light source 100 and reflected by a reflection mirror 113. The reflection mirror 113 reflects the unpolarized beam emitted from the lamp 111 so that the unpolarized beam travels along a light path. The unpolarized beam reflected by the reflection mirror 113 is divided into a plurality of beams by the first lens array 102. The divided beams are focused in front of the second lens array 104. The first and second lens arrays 102 and 104 may be either cylindrical lens arrays or fly-eye lens arrays.

The focused beam passes through the second lens array 104 and is incident upon the PCS 105. The PCS 105 polarizes the incident beam and includes first and second PBSs 123 and 124, which are disposed perpendicular to the direction of the incident beam, and a ½ wavelength plate 122, which is adjacent to the first and second PBSs 123 and 124 and changes the polarization direction of the incident beam.

The first PBS 123 transmits a first beam having one polarization from an unpolarized beam received from the second lens array 104 and, at the same time, reflects a second beam with the other polarization toward the second PBS 124. To achieve this, the first PBS 123 includes a first polarization filter 123a. When the first PBS 123 receives an unpolarized beam, the first polarization filter 123a transmits a P-polarized beam (shown as parallel to the paper) and reflects an S-polarized beam (shown as perpendicular to the paper).

The second PBS 124 re-reflects the second beam received from the first PSB 123 and the second beam becomes parallel to the first beam transmitted by the first PSB 123. To achieve this, the second PBS 124 includes a second polarization filter 124a.

The ½ wavelength plate 122 changes the second beam reflected by the second polarization filter 124a from an S-polarized beam to a P-polarized beam like the first beam.

The PCS 105 increases the light efficiency by converting an unpolarized incident beam into a beam with a single polarization. However, the PCS 105 with the above-described structure generates a beam loss because of cell boundaries of the first and second lens arrays 102 and 104. Furthermore, the structure of the PCS 105 is complicated.

SUMMARY OF THE INVENTION

An apparatus consistent with the present invention provides a highly efficient projection system which increases the light efficiency by maximally utilizing the light emitted from a light source and is compact since only a single scrolling unit is used to scroll color bars.

According to one aspect of the present invention, there is provided a projection system comprising a light source, a polarization conversion system, a reflection mirror, a color separator, a scrolling unit, a light valve, and a projection lens unit. The polarization conversion system has an incidence plane through which light emitted from the light source enters, and transmits a first polarized beam from the incident light, reflects a second polarized beam toward the incidence plane, and changes the polarization of the second polarized beam. The reflection mirror reflects the beam emitted from the incidence plane of the polarization conversion system and the light emitted from the light source toward the incidence plane. The color separator separates an incident beam according to color. The scrolling unit includes at least one lens cell and converts a rotation of the lens cell into a rectilinear motion of an area of the lens cell through which light passes so that the incident beam is scrolled. The light valve processes a beam transmitted by the color separator and the scrolling unit according to an image signal and forms a color picture. The projection lens unit magnifies the color picture formed by the light valve and projects the magnified color picture onto a screen.

The polarization conversion system may comprise a polarization beam splitter, which includes a polarization filter which reflects the second polarized beam and transmits the first polarized beam, a reflection member, which reflects the second polarized beam reflected by the polarization filter toward the polarization filter such that the polarization filter reflects the second beam toward the incidence plane of the polarization convention system, and a wavelength plate, which is installed between the reflection mirror and the polarization beam splitter and changes the polarization of a beam that passes through the wavelength plate.

The polarization conversion system may comprise a polarization beam splitter, which includes first and second polarization filters which transmit the first polarized beams and reflect the second polarized beams, first and second reflection members, which respectively reflect the second polarized beams reflected by the first and second polarization filters toward the first and second polarization filters such that the first and second polarization filters reflect the second beams toward the incidence plane of the polarization conversion system, and a wavelength plate, which is installed between the reflection mirror and the polarization beam splitter and changes the polarization of a beam that passes through the wavelength plate.

The polarization conversion system may comprise a polarization beam splitter, which includes first and second polarization filters, the first and second polarization filters transmitting the first polarized beams, the first polarization filter reflecting the second polarized beam toward the second polarization filter and the second polarization filter reflecting the second polarized beam toward the first polarization filter; and a wavelength plate, which is located between the reflection mirror and the polarization beam splitter and changes the polarization of a beam that passes through the wavelength plate.

The wavelength plate is either a ¼ wavelength plate that covers the entire area of the incidence plane of the polarization conversion system or a ½ wavelength plate that covers half of the incidence plane of the polarization conversion system.

The polarization conversion system may comprise a polarization beam splitter, which is located in one half of a region adjacent to an optical axis and includes a polarization filter which transmits the first polarized beam and reflects the second polarized beam, a first reflection member, which reflects the second polarized beam reflected by the polarization beam splitter toward the polarization filter such that the polarization filter reflects the second polarized beam toward the incidence plane of the polarization conversion system, and a wavelength plate, which is installed between the reflection mirror and the polarization beam splitter and changes the polarization of an incident beam. The wavelength plate is a ¼ wavelength plate.

The reflection mirror may be a parabolic reflection mirror.

The color separator may include first, second, and third dichroic filters, which are disposed between the light source and the scrolling unit at different angles and each reflects a beam of a color and transmits beams of all other colors.

The color separator may include first, second, and third dichroic prisms, which are sequentially attached to one another between the light source and the scrolling unit, and the first, second, and third dichroic prisms respectively include first, second, and third dichroic filters, each of which reflects a beam of a color and transmits beams of all other colors.

The color separator may include first, second, and third dichroic filters, which are disposed in parallel between the scrolling unit and the light valve and each reflects a beam of a color and transmits beams of all other colors. A prism may be installed in front of this color separator.

The scrolling unit may include a spiral lens disk on which at least one cylindrical lens cell is spirally arranged.

The scrolling unit may include first and second spiral lens disks, which are disposed apart from each other and each include at least one cylindrical lens cell that is spirally arranged, and a glass rod installed between the first and second spiral lens disks.

The projection system may further comprise a focusing lens, which is disposed between the light source and the scrolling unit and focuses light emitted from the light source, a spatial filter, which is disposed between the light source and the scrolling unit and controls the divergence angle of the light emitted from the light source, and a collimating lens, which is disposed on a light path between the light source and the scrolling unit and collimates incident light.

The projection system may further comprise first and second cylindrical lenses which are respectively disposed in front of and behind the scrolling unit. The projection system may further comprise first and second fly-eye lens arrays which are sequentially disposed on a light path between the scrolling unit and the light valve. In this case, a relay lens may be disposed on a light path between the second fly-eye lens array and the light valve.

The projection system may further comprise a polarization beam splitter, which is disposed on a light path between the scrolling unit and the light valve and transmits a first polarized beam from the incident beam and reflects a second polarized beam from the incident beam. The projection lens unit magnifies a color picture that is formed by the light valve and reflected by the polarization beam splitter and projects the magnified color picture to the screen. In this case, the light valve may be a reflective liquid crystal display.

The polarization beam splitter includes a substrate and wire grids, which are formed on one surface of the substrate. The polarization beam splitter is disposed such that the wire grids face the light valve.

BRIEF DESCRIPTION OF THE DRAWINGS

The above and other features and advantages of the present invention will be readily apparent by describing, in detail, exemplary embodiments thereof with reference to the accompanying drawings, in which.

DETAILED DESCRIPTION OF ILLUSTRATIVE, NON-LIMITING EMBODIMENTS OF THE INVENTION

Figure 1:
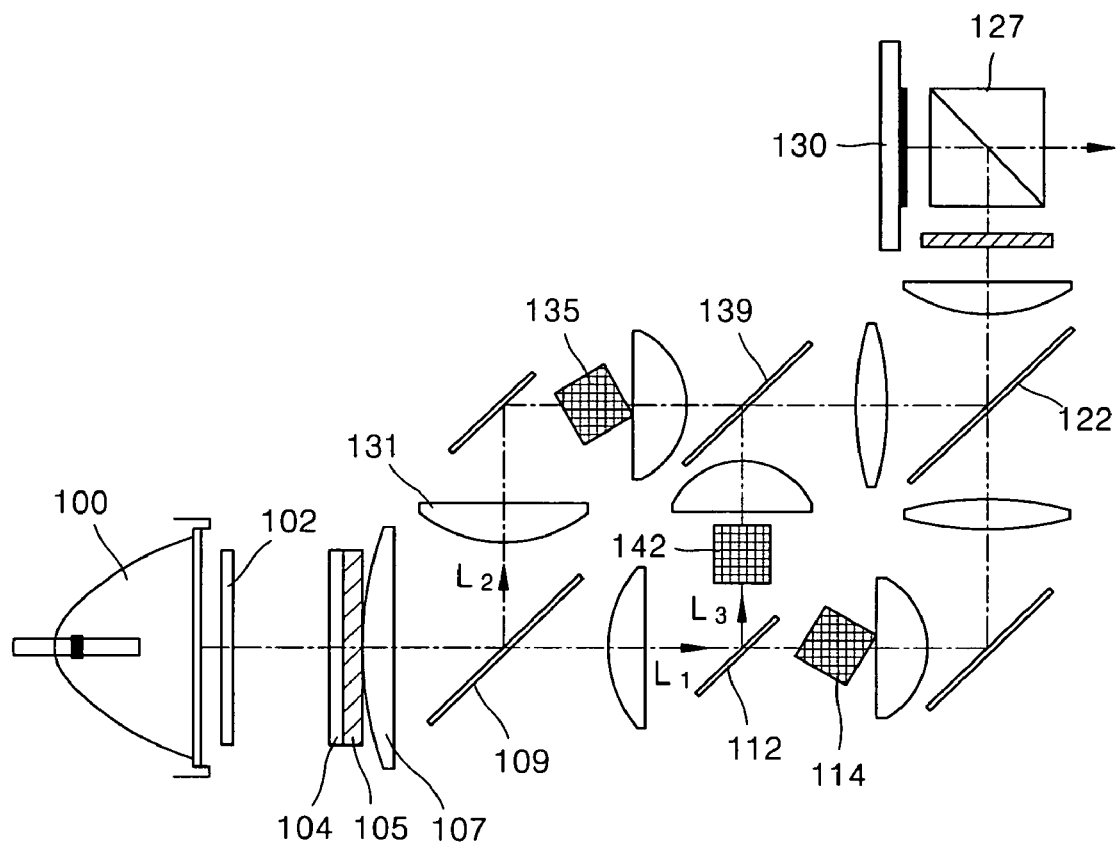
FIG. 1 is a schematic diagram of a conventional projection system.
Figure 2:
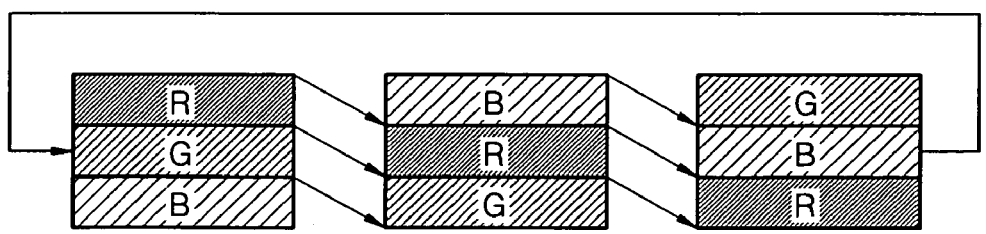
FIG. 2 illustrates R, G, and B color bars to explain the color scrolling operation of the conventional projection system of FIG. 1.
Figure 3:
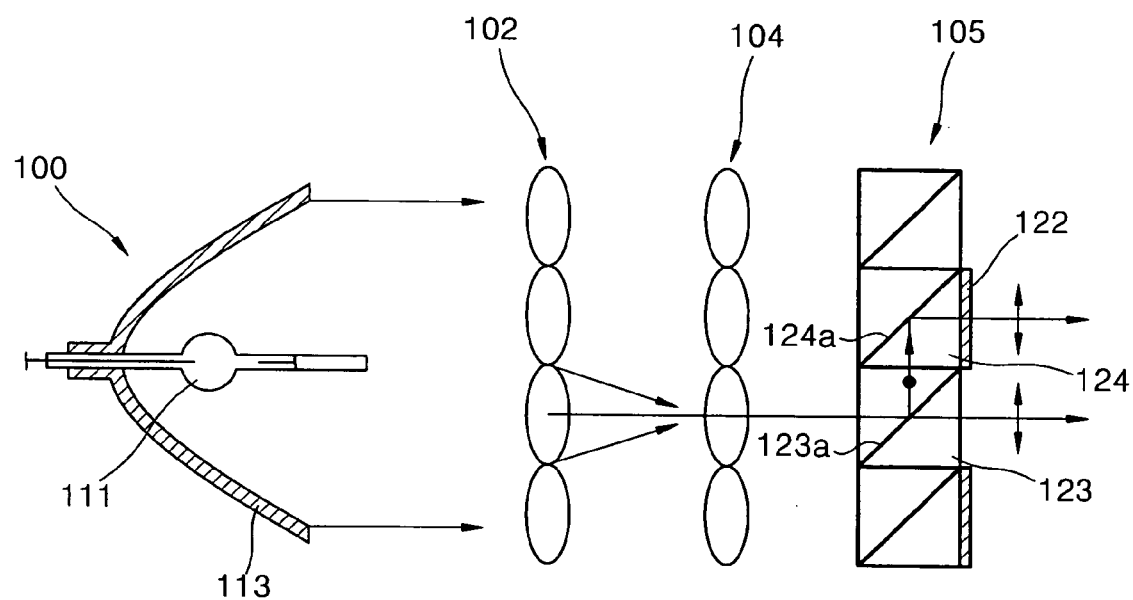
FIG. 3 is a schematic diagram of an illumination system included in the conventional projection system of FIG. 1.

An apparatus consistent with the present invention will now be described more fully with reference to the accompanying drawings, in which illustrative, non-limiting embodiments of the invention are shown. In the drawings, like reference numbers refer to like elements throughout and the sizes of elements may be exaggerated for clarity.

Figure 4:
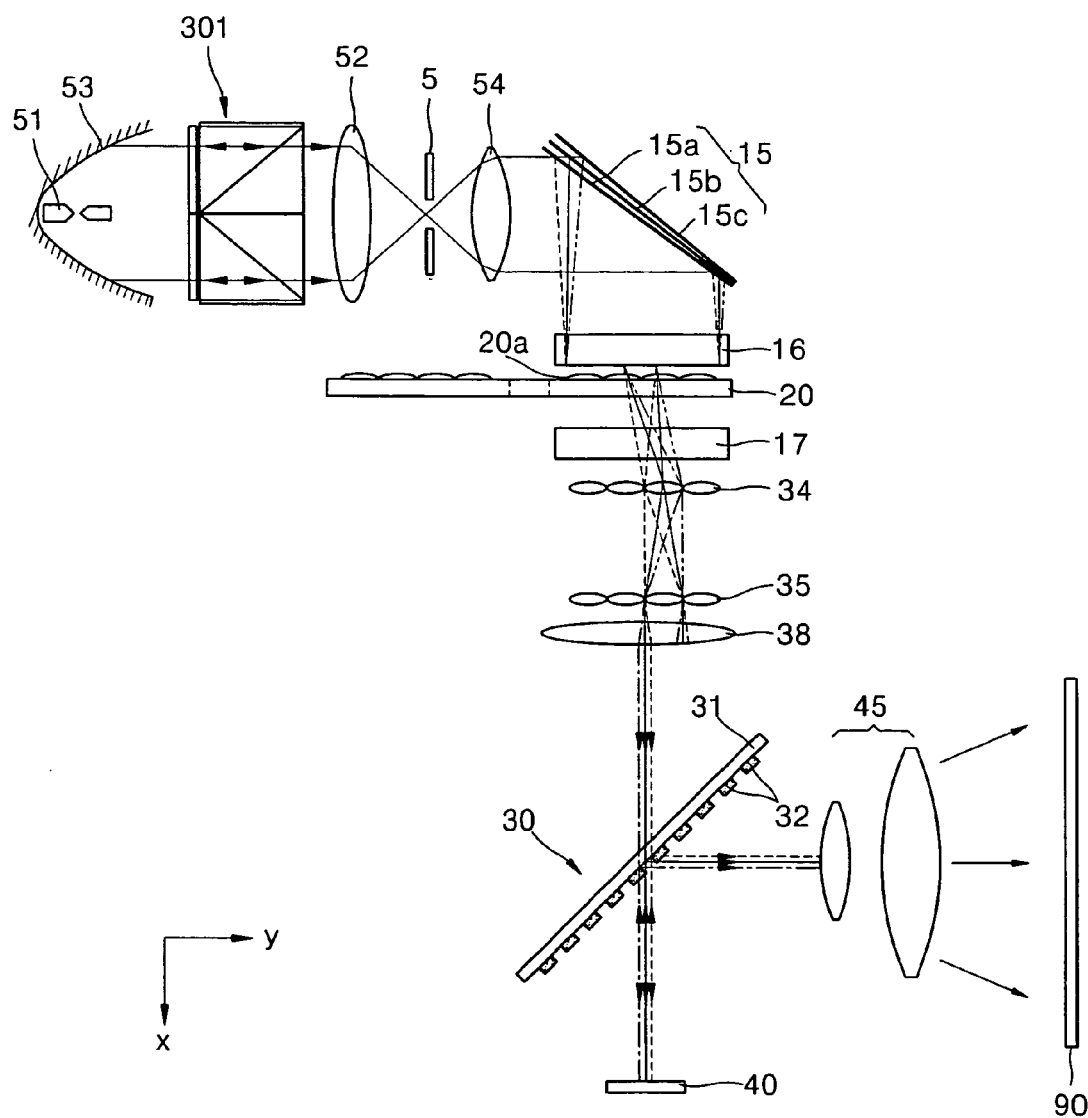
FIG. 4 is a schematic diagram of a projection system according to a first embodiment of the present invention.

FIG. 4 is a schematic diagram of a projection system according to a first embodiment of the present invention. Referring to FIG. 4, the projection system according to the first embodiment of the present invention includes a light source 51, a polarization conversion system (PCS) 301, a reflection mirror 53, a color separator 15, a scrolling unit 20, a light valve 40, and a projection lens unit 45. The PCS 301 reflects a beam having one polarization of a beam received from the light source 51 back to the reflection mirror 53. The reflection mirror 53 reflects the received beam to the PCS 301. The color separator 15 separates light transmitted by the PCS 301 into R, G, and B beams. The scrolling unit 20 scrolls R, G, and B beams, into which the beam transmitted by the PCS 301 has been separated by the color separator. The light valve 40 processes the beams transmitted by the scrolling unit 20 according to an image signal and forms a picture. The projection lens unit 45 magnifies the picture formed by the light valve 40 and projects the magnified picture onto a screen 90.

The light source 51 generates and emits white light and includes a lamp, such as, a Xenon lamp, a halogen lamp, or the like. Since the lamp-type light source 51 emits white light in all directions, the reflection mirror 53 reflects light emitted from the light source 51 and light received from the PCS 301 toward the PCS 301. Preferably, but not necessarily, the reflection mirror 53 is a parabolic mirror which uses a light source as a focal point and collimates incident light beams.

FIGS. 5 through 11 are schematic diagrams of PCSs 301 through 307, respectively, which can be used in the projection system of FIG. 4. Each of the PCSs 301 through 307 includes at least one incidence surface In through which the white light emitted from the light source 51 enters. Each of the PCSs 301 through 307 transmits a first polarized beam of the white light that enters the PCS through the incidence surface In (for example, a P-polarized beam, shown as parallel to the paper) and reflects a second polarized beam (for example, an S-polarized beam, shown as perpendicular to the paper) back to the incidence surface In and the second polarized beam is converted into a P-polarized beam.

Figure 5:
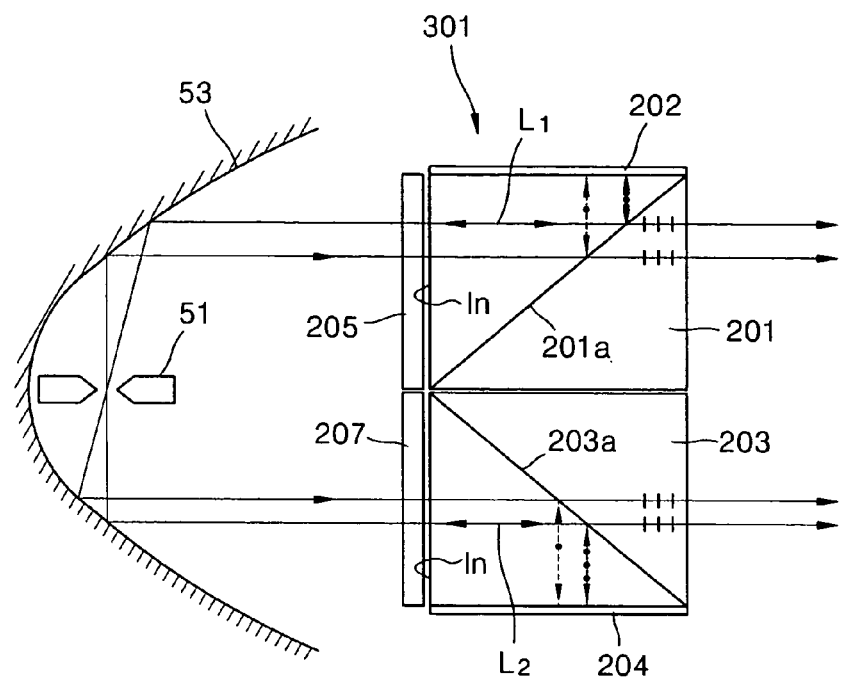
FIGS. 5 through 11 are schematic diagrams of polarization conversion systems used in the projection system of FIG. 4.

Referring to FIG. 5, the PCS 301 includes a PBS, first and second reflection members 202 and 204, and a wavelength plate. The PBS includes first and second polarization filters 201a and 203a, each of which transmits the first polarized beam and reflects the second polarized beam. The first and second reflection members 202 and 204 reflect the second polarized beams (e.g., S-polarized beams) reflected by the first and second polarization filters 201a and 203a toward the incidence surface In. The wavelength plate is disposed between the reflection mirror 53 and the incidence surface In and changes the polarization of light that passes through the wavelength plate.

The PBS of the PCS 301 includes first and second PBSs 201 and 203 which include the first and second polarization filters 201a and 203a, respectively. The first and second PBSs 201 and 203 can be integrated such that a single PBS is formed of two right-angled triangular prisms and one isosceles triangular prism. The first and second polarization filters 201a and 203a are symmetrical about the optical axis.

The first and second reflection members 202 and 204 are installed on one side of the first PBS 201 and one side of the second PBS 203, respectively, and are symmetrical about the optical axis.

The wavelength plate includes first and second wavelength plates 205 and 207, which are located in front of the incidence surface In and each cover a half of the incidence surface In. The wavelength plate changes the polarization of light that is emitted from the incidence surface In and travels toward the reflection mirror 53, and again changes the polarization of light that is reflected by the reflection mirror 53 and travels toward the incidence surface In. Preferably, but not necessarily, the first and second wavelength plates 205 and 207 are ¼ wavelength plates. The first and second wavelength plates 205 and 207 may be replaced by a single wavelength plate that is disposed in front of the entire area of the incidence surface In.

An illustrative, non-limiting process by which light with a single polarization is emitted from the PCS 301 will now be described.

First, natural light (unpolarized light) is emitted from the light source 51. A beam $L_1$ emitted from the light source 51 is incident upon the first polarization filter 201a of the first PBS 201 via the first wavelength plate 205 either without undergoing any reflection or after being reflected by the reflection mirror 53. Similarly, a beam $L_2$ emitted from the light source 51 is incident upon the second polarization filter 203a of the second PBS 203 via the second wavelength plate 207 either without undergoing any reflection or after being reflected by the reflection mirror 53. Each of the light beams $L_1$ and $L_2$, which are incident upon the first and second PBSs 201 and 203 after being emitted from the light source 51, includes P- and S-polarization components.

Each of the first and second wavelength plates 205 and 207 changes S- and P-polarized beams to first and second circularly polarized beams, respectively. For example, if the first and second polarization filters 201a and 203a of the first and second PBSs 201 and 203 transmit a P-polarized beam and reflect an S-polarized beam, the first polarization filter 201a transmits a P-polarized beam of the beam $L_1$, which is incident upon the first PBS 201 via the first wavelength plate 205, toward the color separator 15. The first polarization filter 201a reflects an S-polarized beam toward the incidence surface In via the first reflection member 202. The S-polarized beam is changed to a first circularly polarized beam while passing through the first wavelength plate 205. The first circularly polarized beam is changed to a second circularly polarized beam when first reflected by the reflection mirror 53, and is changed back to the first circularly polarized beam when reflected again by the reflection mirror 53. The first circularly polarized beam is directed toward the second wavelength plate 207 and is changed to a P-polarized beam while passing through the second wavelength plate 207. The P-polarized beam passes through the second polarization filter 203a of the second PBS 203 toward the color separator 15. Similarly, the P-polarized beam of the beam $L_2$, incident upon the second PBS 203 via the second wavelength plate 207, is transmitted by the second polarization filter 203a toward the color separator 15. The S-polarized beam is reflected by the second polarized filter 203a and then reflected by the second reflection member 204. Thereafter, the S-polarized beam is changed to a P-polarized beam while passing through the second wavelength plate 207, the reflection mirror 53, and the first wavelength plate 205. The P-polarized beam passes through the first polarization filter 201a of the first PBS 201 and advances toward the color separator 15. Thus, the PCS 301 emits a beam with a single polarization.

Figure 6:
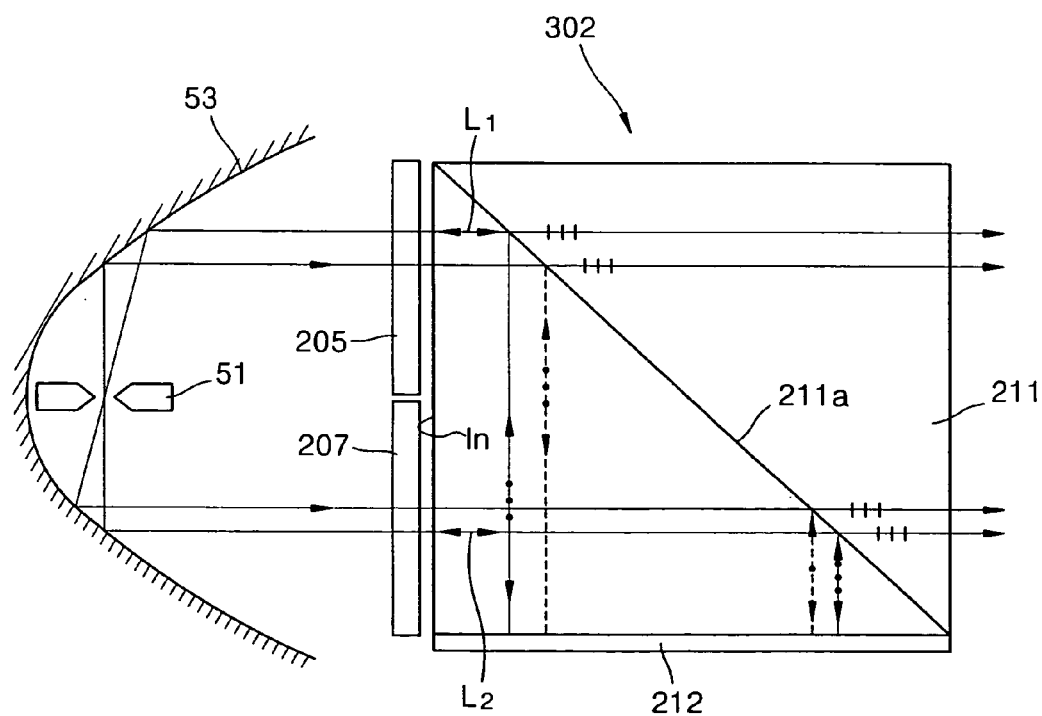

Referring to FIG. 6, the PCS 302 includes a PBS 211, first and second wavelength plates 205 and 207, and a reflection member 212. The PBS 211 includes a polarization filter 211a, which is faced by the entire area of the incidence surface In. The reflection member 212 reflects light that is reflected by the polarization filter 211a such that the light is fed back to the incidence surface In. The first and second wavelength plates 205 and 207 may be replaced by a single wavelength plate. Because the process by which the PCS 302 emits light with a single polarization component is the same as that described above with reference to FIG. 5, the description thereof will not be repeated.

Figure 7:
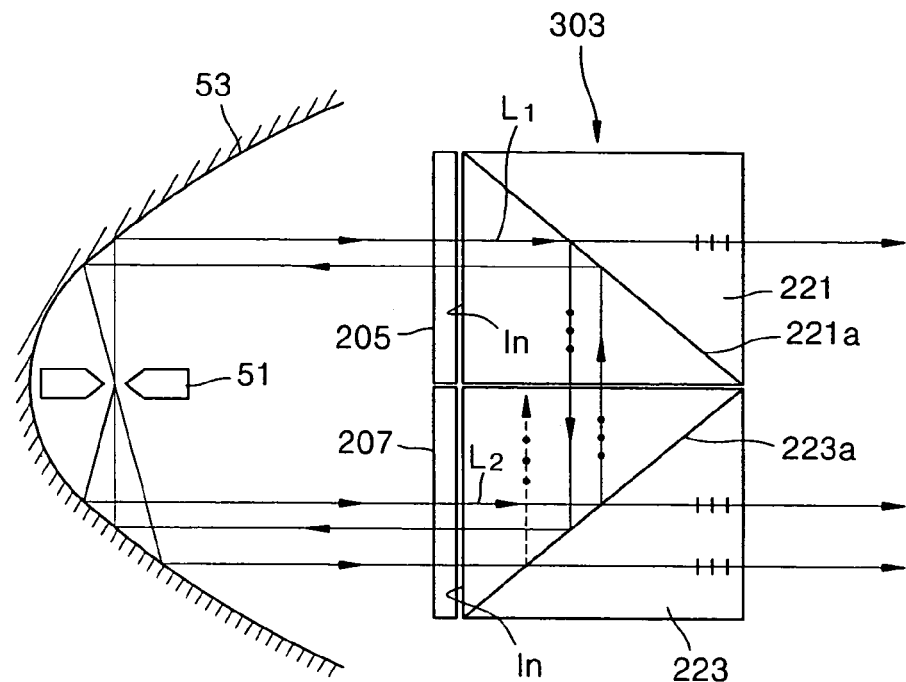

Referring to FIG. 7, the PCS 303 includes a PBS and first and second wavelength plates 205 and 207. The PBS includes first and second polarization filters 221a and 223a, which transmit first polarized beams and reflect second polarized beams so that the second polarized beams are fed back to the incidence surface In. The PBS can include a first PBS 221 that includes the first polarization filter 221a and a second PBS 223 that includes the second polarization filter 223a. The first and second PBSs 221 and 223 can be integrated so that the single PBS includes two right-angled triangular prisms and one isosceles triangular prism. In contrast with the PCS 301 of FIG. 5, the PCS 303 of FIG. 7 does not include the first and second reflection members 202 and 204 of FIG. 5. The first and second wavelength plates 205 and 207 can be replaced by a single wavelength plate.

In the PCS 303, if the first and second polarization filters 221a and 223a transmit a P-polarized beam and reflects an S-polarized beam, a P-polarized beam of the beam $L_1$ that is emitted from a light source 51 and incident upon the first PBS 221 via the first wavelength plate 205 is transmitted by the first polarization filter 221a toward the color separator 15. An S-polarized beam of the beam $L_1$ is reflected by the first polarization filter 221a and then reflected by the second polarization filter 223a toward the incidence surface In. Similarly, a P-polarized beam of the beam $L_2$ that is emitted from the light source 51 and incident upon the second PBS 223 via the second wavelength plate 207 is transmitted by the second polarization filter 223a toward the color separator 15. An S-polarized beam of the beam $L_2$ is reflected by the second polarization filter 223a and then reflected by the first polarization filter 221a toward the incidence surface In. The S-polarized beams fed back to the incidence surface In are changed to P-polarized beams while passing through the first and second wavelength plates 205 and 207. Each of the P-polarized beams is transmitted by the first or second polarization filter 221a or 223a of the first or second PBS 221 or 223 toward the color separator 15.

Figure 8:
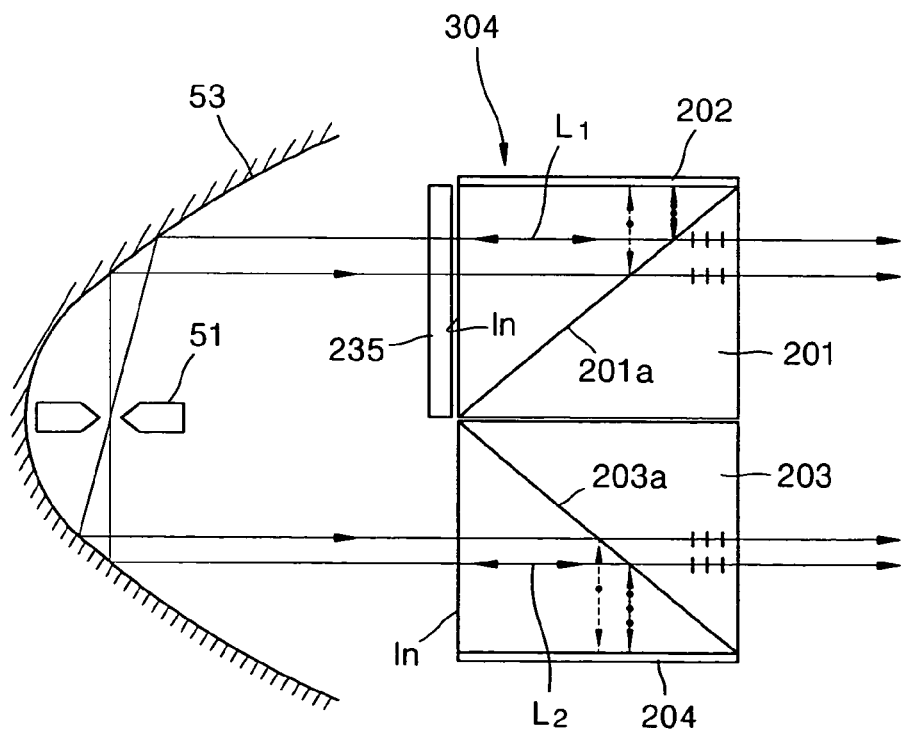
Figure 9:
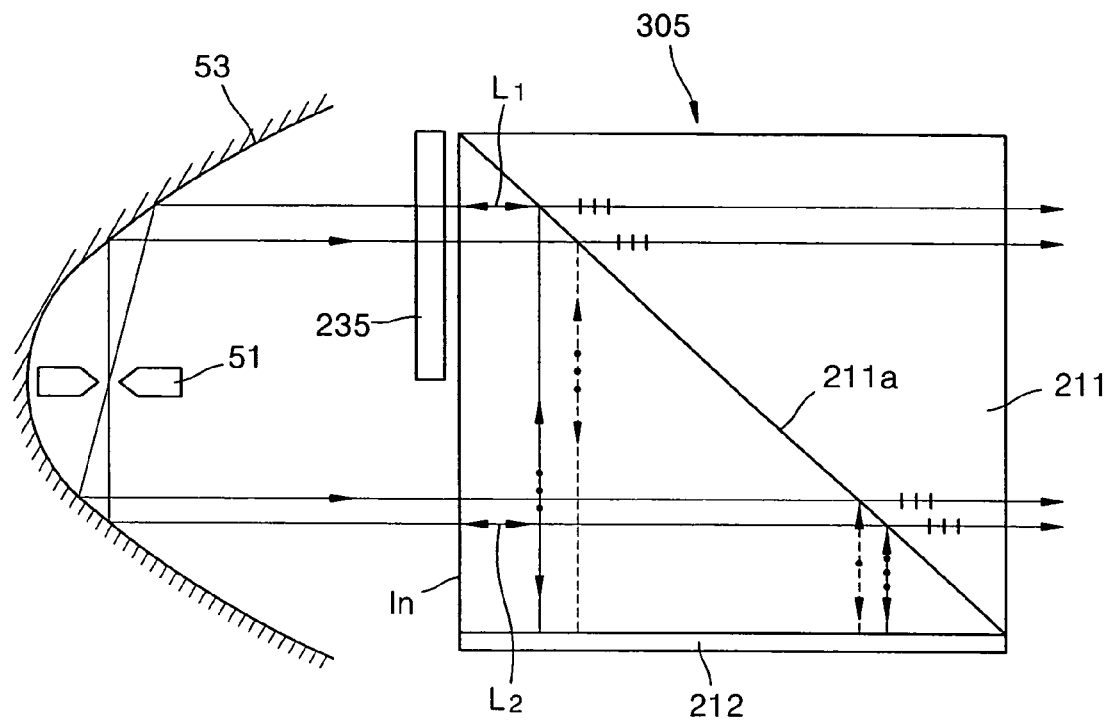
Figure 10:
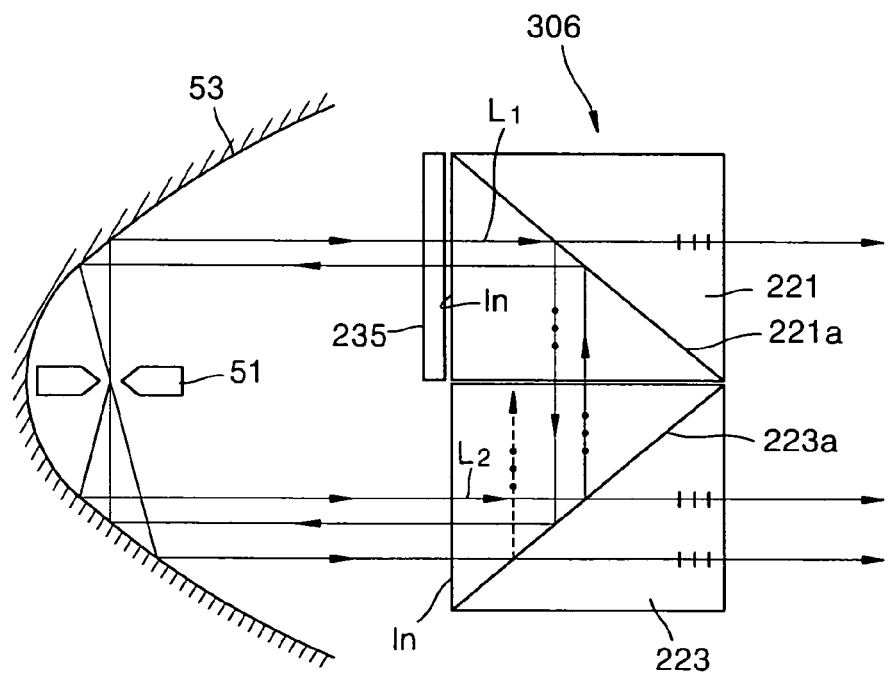

The PCSs 304, 305, and 306 of FIGS. 8, 9, and 10 are the same as the PCSs 301, 302, and 303 of FIGS. 5, 6, and 7, respectively, except that a wavelength plate 235 is included instead of the first and second wavelength plates 205 and 207. Referring to FIGS. 8 through 10, the wavelength plate 235 is installed in front of the incidence surface In such that half of the incidence surface In is covered by the wavelength plate 235. The wavelength plate 235 changes the polarization of incident light. Preferably, but not necessarily, the wavelength plate 235 is a ½ wavelength plate.

An illustrative, non-limiting process by which a beam having a single polarization is emitted from the PCSs 304 through 306, when the wavelength plate 235 is a ½ wavelength plate, will now be described with reference to FIG. 8.

Referring to FIG. 8, if first and second polarization filters 201a and 203a of first and second PBSs 201 and 203, respectively, transmit a P-polarized beam and reflect an S-polarized beam, and the wavelength plate 235 is located in front of the first PBS 201, a P-polarized beam of a beam $L_1$, which is emitted from the light source 51 and incident upon the first PBS 201 via the wavelength plate 235, is transmitted by the first polarization filter 201a toward the color separator 15 of FIG. 4. An S-polarized beam of the beam $L_1$ is reflected by the first polarization filter 201a toward a first reflection member 202. The S-polarized beam is reflected by the first reflection member 202 and then reflected by the first polarization filter 201a such that the S-polarized beam is fed back to the incidence surface In. The S-polarized beam fed back to the incidence surface In is changed to a P-polarized beam while passing through the wavelength plate 235. The P-polarized beam is reflected twice by the reflection mirror 53 and then enters the second PBS 203 through the incidence surface In. The P-polarized beam is transmitted by the second polarization filter 203a toward the color separator 15. Similarly, a P-polarized beam of a beam $L_2$, which is emitted from the light source 51 and incident upon the second PBS 203, is transmitted by the second polarization filter 203a toward the color separator 15. An S-polarized beam of the beam $L_2$ is reflected by the second polarization filter 203a toward a second reflection member 204. The S-polarized beam is reflected by the second reflection member 204 and then reflected by the second polarization filter 203a such that the S-polarized beam moves toward the incidence surface In. The S-polarized beam fed back to the incidence surface In is reflected twice by the reflection mirror 53 and then enters the wavelength plate 235. The S-polarized beam is changed to a P-polarized beam while passing through the wavelength plate 235. The P-polarized beam enters the first PBS 201 through the incidence surface In and is then transmitted by the first polarization filter 201a toward the color separator 15. Thus, the PCS 304 emits a beam with a single polarization component.

Figure 11:
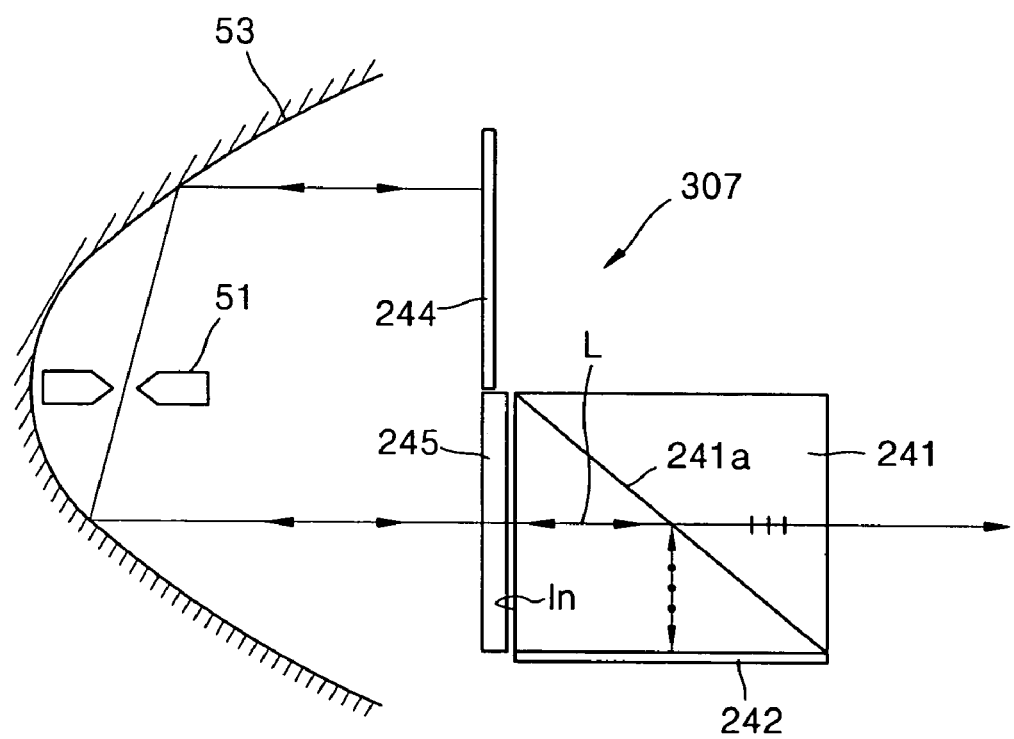

Referring to FIG. 11, the PCS 307 is located on one side of the optical axis and includes a PBS 241, a wavelength plate 245, and first and second reflection members 242 and 244. The PBS 241 has a polarization filter 241a, which transmits or reflects a beam that enters the PBS 241 through the incidence surface In according to polarization. The wavelength plate 245 is adjacent to the incidence surface In of the PBS 241. The first reflection member 242 reflects a beam reflected by the polarization filter 241a to the polarization filter 241a, which reflects the beam to the incidence surface In. The second reflection member 244 reflects an incident beam toward the reflection mirror 53. Preferably, but not necessarily, the wavelength plate 245 is a ¼ wavelength plate.

The beam that is emitted from the light source 51 and incident upon the PBS 241 via the wavelength plate 245 is an unpolarized beam that includes P- and S-polarizations. The beam incident upon the PBS 241 can be 1) a beam that is emitted from the light source 51 and incident upon the PBS 241 without being reflected by the reflection mirror 53, 2) a beam that is emitted from the light source 51, reflected by the reflection mirror 53, and incident upon the PBS 241, or 3) a beam that is emitted from the light source 51, reflected once by the reflection mirror 53, once by the second reflection member 244, and twice again by the reflection mirror 53, before being incident upon the PBS 241.

If the polarization filter 241a of the PBS 241 transmits a P-polarized beam and reflects an S-polarized beam, and the wavelength plate 245 changes an S-polarized beam and a P-polarized beam to circularly-polarized beams, a P-polarized beam of a beam that is emitted from the light source 51 and incident upon the PBS 241 is transmitted by the polarization filter 241a toward the color separator 15. An S-polarized beam of the beam emitted by the light source 51 is reflected by the polarization filter 241a toward the first reflection member 242. The S-polarized beam is reflected by the first reflection member 242 toward the polarization filter 241a which reflects the S-polarized beam toward the incidence surface In. The S-polarized beam fed back to the incidence surface In is changed to a first circularly polarized beam while passing through the wavelength plate 245. The first circularly polarized beam is changed to a second circularly polarized beam after being twice reflected by the reflection mirror 53, reflected by the second reflection mirror 244, and then twice reflected by the reflection mirror 53. The second circularly polarized beam passes through the wavelength plate 245 and is changed to a P-polarized beam. The P-polarized beam passes through the polarization filter 241a toward the color separator 15 of FIG. 4. Thus, the PCS 307 emits a beam having a single polarization.

Referring back to FIG. 4, a focusing lens 52 that focuses light that has been emitted from the light source 51 and transmitted by the PCS 301 is disposed between the light source 51 and the color separator 15. A collimating lens 54 that collimates incident light is disposed between the focusing lens 52 and the color separator 15.

A spatial filter 5 that has a slit is installed between the focusing lens 52 and the collimating lens 54. The spatial filter 5 controls a divergence angle or etendue of the light emitted from the light source 51 and is designed such that the width of the slit can be changed. Preferably, but not necessarily, the width of the slit is controlled in a color separation direction or a color scrolling direction.

The color separator 15 separates the light emitted from the light source 51 into three color beams, namely, R, G, and B beams. The color separator 15 includes first, second, and third dichroic filters 15a, 15b, and 15c disposed at different angles with respect to an incident light axis. The color separator 15 separates incident light according to predetermined wavelength ranges and reflects the separated light beams at different angles. For example, the first dichroic filter 15a reflects a beam in the red wavelength range, R, of white incident light and transmits beams in the green and blue wavelength ranges, G and B. The second dichroic filter 15b reflects the G beam of the beams transmitted by the first dichroic filter 15a and transmits the B beam. The third dichroic filter 15c reflects the B beam transmitted by the first and second dichroic filters 15a and 15b. Consequently, the R, G, and B beams, into which incident light has been separated according to wavelength by the first, second, and third dichroic filters 15a, 15b, and 15c, are reflected at different angles. One non-limiting example would be that the R and B beams are focused on the G beam and all three beams coincide at the scrolling unit 20.

The scrolling unit 20 includes at least one lens cell and scrolls the R, G, and B beams reflected by the color separator 15. The scrolling unit 20 scrolls incident color beams by converting the rotation of the lens cell into a rectilinear motion of an area of the lens cell through which light passes. This scrolling will be described later in greater detail.

Figure 12:
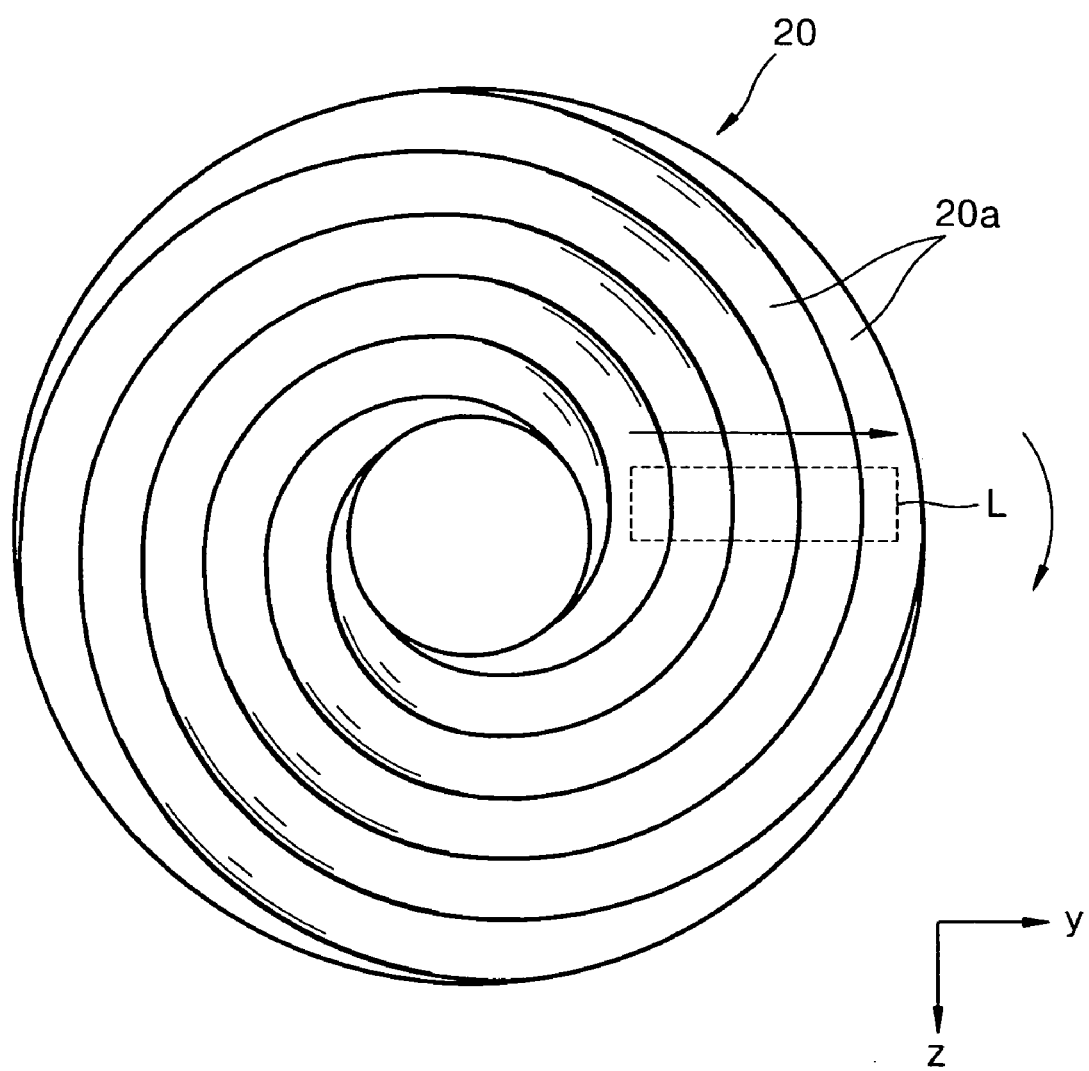
FIG. 12 is a front view of the scrolling unit used in the projection system of FIG. 4.

FIG. 12 is a front view of a spiral lens disk used as the scrolling unit 20. The scrolling unit 20 includes at least one cylindrical lens cell, which is disposed spirally on the scrolling unit 20, as illustrated in FIG. 12. Referring to FIG. 12, reference character L denotes an area of the scrolling unit 20 on which a beam is incident.

Figure 13:
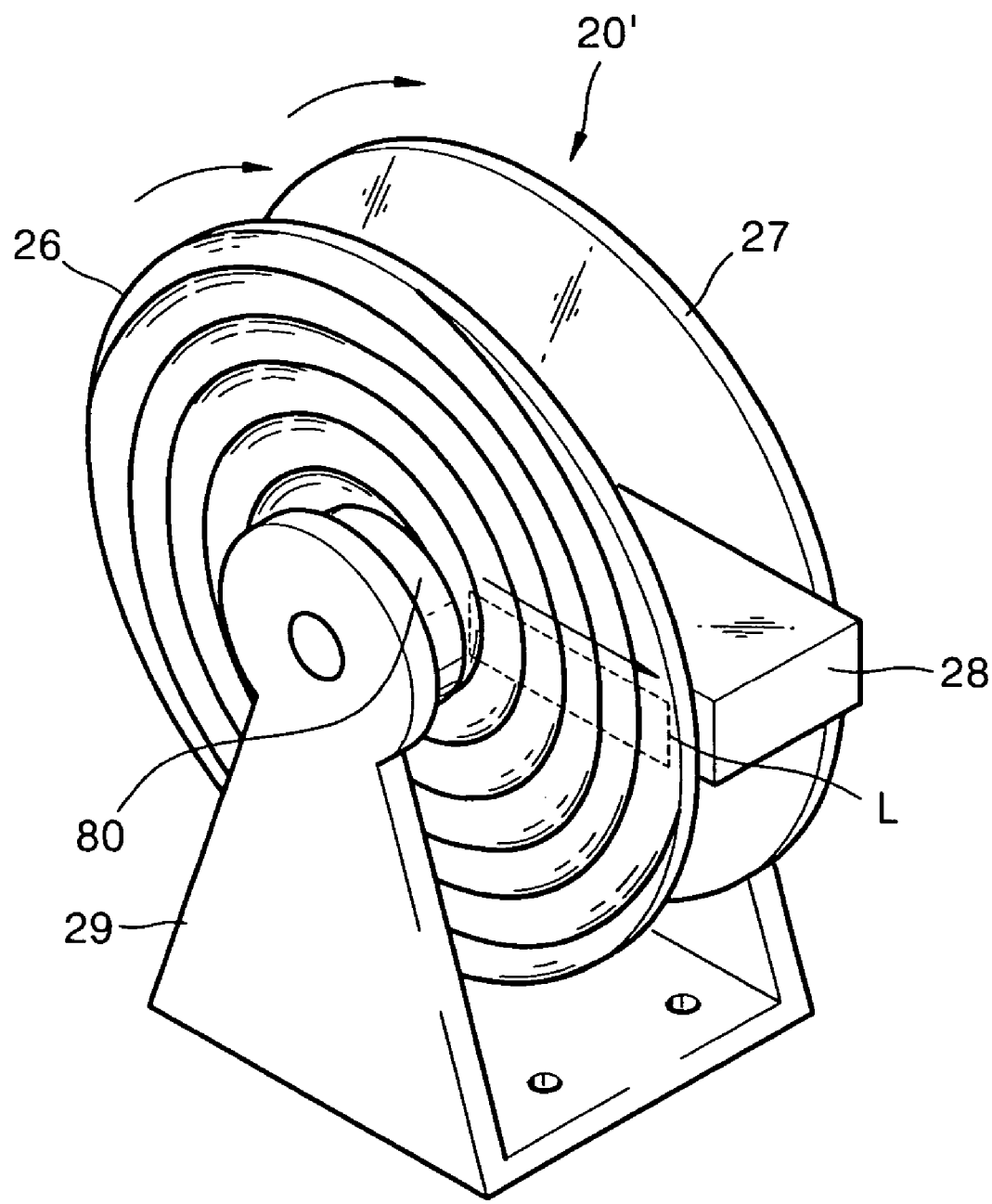
FIG. 13 is a perspective view of another scrolling unit that can be used in the projection system of FIG. 4.

FIG. 13 is a perspective view of a scrolling unit 20' that can be adopted in the projection system of FIG. 4. Referring to FIG. 13, the scrolling unit 20' includes first and second spiral lens disks 26 and 27, disposed a predetermined distance from each other, and a glass rod 28, interposed between the first and second spiral lens disks 26 and 27. A spiral arrangement of cylindrical lens cells is disposed on at least one side of each of the first and second spiral lens disks 26 and 27. The first and second spiral lens disks 26 and 27 can be rotated and are supported by a bracket 29 such that they are rotated at the same speed by a driving source 80.

Referring back to FIG. 4, first and second cylindrical lenses 16 and 17 are installed in front of and behind the scrolling unit 20, respectively. First and second fly-eye lens arrays 34 and 35 and a relay lens 38 are disposed on a light path between the second cylindrical lens 17 and the light valve 40. The width of a light beam incident upon the scrolling unit 20 is reduced by the first cylindrical lens 16, thereby reducing light loss. The light transmitted by the scrolling unit 20 is returned to its original width by the second cylindrical lens 17.

The light valve 40 processes the light transmitted by the scrolling unit 20 according to an image signal and forms a color picture.

Figure 14:
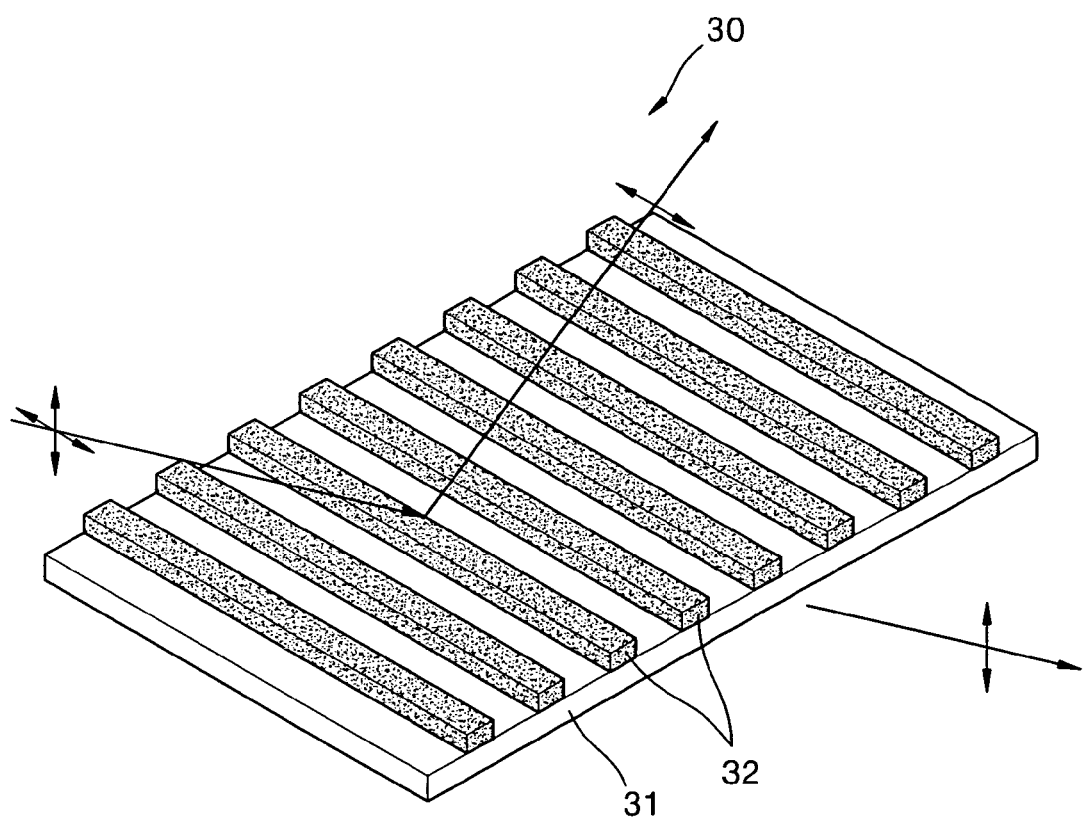
FIG. 14 is a perspective view of a wire grid polarization beam splitter that can be adopted in the projection system of FIG. 4.

Referring to FIG. 4, a wire grid PBS 30 can be installed between the relay lens 38 and the light valve 40. The light valve 40 may be a reflective liquid crystal display. FIG. 14 is a perspective view of the wire grid PBS 30. Referring to FIG. 14, the wire grid PBS 30 includes a substrate 31 and wire grids 32, which are arranged in parallel at regular intervals and are disposed on one side of the substrate 31. The substrate 31 is made of glass, and the wire grids 32 are formed of a conductive material. The wire grid PBS 30 transmits or reflects an incident beam according to a polarization of the incident beam. More specifically, as illustrated in FIG. 14, the wire grid PBS 30 reflects a first polarized beam, for example, an S-polarized beam of an incident beam and transmits a second polarized beam, for example, a P-polarized beam. The polarization of the second polarized beam transmitted by the wire grid PBS 30 is changed by modulation of each of the cells of the light valve 40, and the resultant beam re-enters the wire grid PBS 30 and is reflected thereby toward the projection lens unit 45.

The wire grid PBS 30 is installed at an angle to an incident light axis. Referring to FIG. 4, the wire grid PBS 30 is preferably, but not necessarily, disposed such that the wire grids 32 are on the side of the wire grid PBS 30 that faces the light valve 40. This disposition of the wire grid PBS 30 prevents the beam emitted from the light valve 40 from passing through the glass substrate 31, so that an aberration, such as astigmatism, is not generated.

The projection system according to the first embodiment of the present invention can adopt a MacNeille-type PBS that has a polarization filter, which is a dielectric coating film, instead of the wire grid PBS 30. However, the use of the wire grid PBS 30 prevents improper polarization separation of a beam with a wide incidence angle, thus improving contrast.

The projection lens unit 45 magnifies the color picture that is formed by the light valve 40 and reflected by the wire grid PBS 30 and projects the magnified color picture onto the screen 90.

An illustrative, non-limiting operation of the projection system of FIG. 4 with the above-described configuration will now be described with reference to FIG. 4. First, white light emitted from the light source 51 is incident upon the color separator 15 via the PCS 301, the focusing lens 52, the spatial filter 5, and the collimating lens 54.

Next, the white light incident upon the color separator 15 is separated into three color beams, namely, R, G, and B beams, by the first, second, and third dichroic filters 15a, 15b, and 15c, and then the R, G, and B beams are incident upon the scrolling unit 20. The width of the light incident upon the scrolling unit 20 is reduced by the first cylindrical lens 16 located in front of the scrolling unit 20.

Figure 15A:
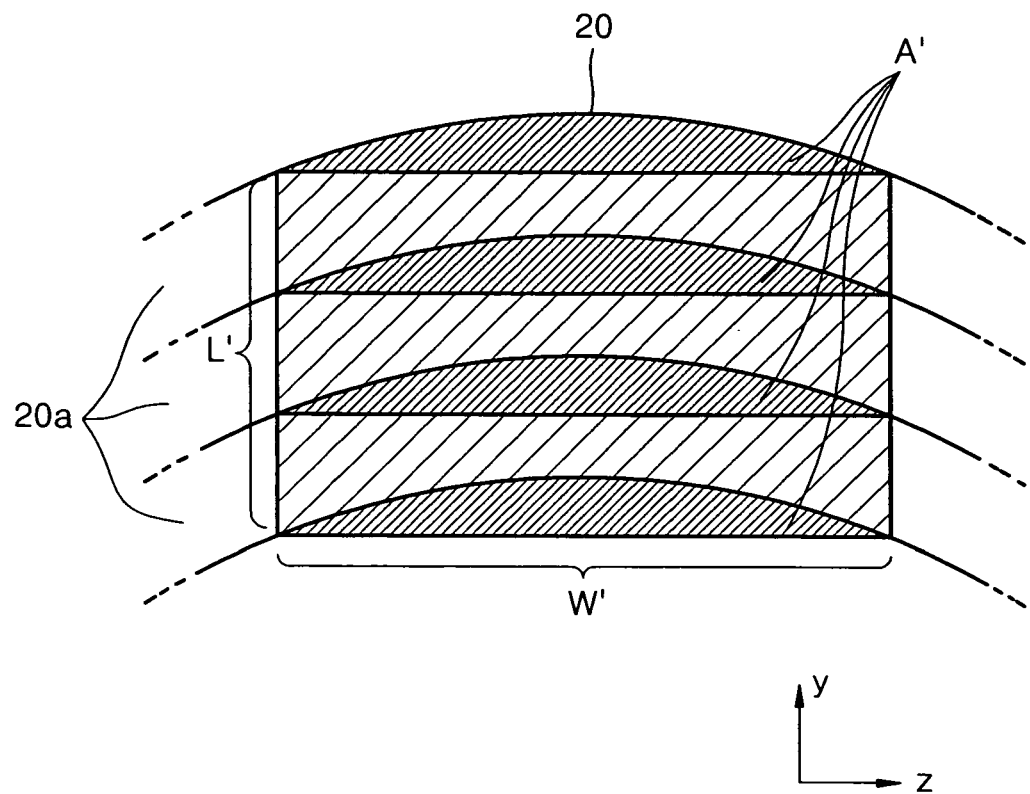
FIG. 15A illustrates the shape of a beam landing on a spiral lens disk when no cylindrical lenses are used in the projection system of FIG. 4.
Figure 15B:
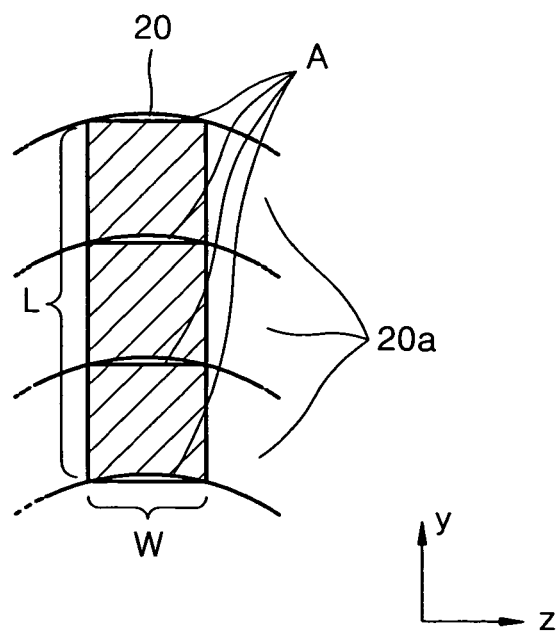
FIG. 15B illustrates the shape of a beam landing on a spiral lens disk when a cylindrical lens is used in the projection system of FIG. 4.

FIG. 15A illustrates a beam L' that is emitted from the light source 51 and incident on the scrolling unit 20 without passing through the first cylindrical lens 16. Beam L' has a width W'. FIG. 15B illustrates a beam L that has a width W reduced by the first cylindrical lens 16 and which is then incident upon the scrolling unit 20. When a beam passing through the scrolling unit 20 is relatively wide, that is, in the case of the beam L', the curved shape of the array of spirally arranged lens cells 20a does not match with that of the beam L' and thus, there is light loss over an unmatched area A' for each color. To minimize the light loss, preferably, but not necessarily, the first cylinder lens 16 is included so that the beam L with a reduced width W is produced as illustrated in FIG. 15B. The shape of the array of spirally arranged lens cells 20a, as illustrated in FIG. 15B, aligns more closely with that of the beam L. Hence, an unmatched area A, for each color, when the first cylindrical lens 16 is used is smaller than the unmatched area A', when a cylindrical lens is not used. Consequently, the light loss is reduced by the use of the cylindrical lens.

Referring back to FIG. 4, the R, G, and B beams with reduced widths are transmitted by the scrolling unit 20, and then the R, G, and B beams are returned to their original widths while passing through the second cylindrical lens 17. As described above, by controlling the width of light using the first and second cylindrical lenses 16 and 17, light loss can be reduced, and the quality of a color picture can be improved.

Next, the R, G, and B beams transmitted by the second cylindrical lens 17 are focused on each of the lens cells of the first and second fly-eye lens arrays 34 and 35. The focused R, G, and B beams are separated while passing through the relay lens 38, and the separated R, G, and B beams are incident on corresponding color areas of the light valve 40 forming color bars.

Before reaching the light valve 40, the R, G, and B beams transmitted by the relay lens 38 are transmitted or reflected by the wire grid PBS 30 according to the polarizations of the R, G, and B beams. While the R, G, and B beams are being reflected by the light valve 40, the polarizations of the R, G, and B beams are changed by modulation of each of the cells of the light valve 40. Then, the R, G, and B beams with the changed polarization are reflected by the wire grid PBS 30 toward the projection lens unit 45.

Figure 16A:
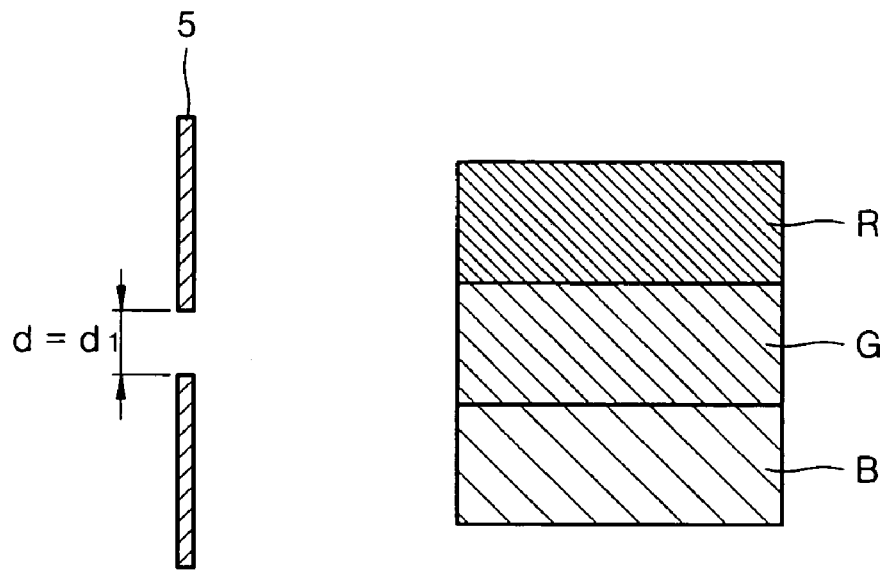
FIGS. 16A through 16C show color bars produced by different spatial filters of the projection system of FIG. 4.
Figure 16B:
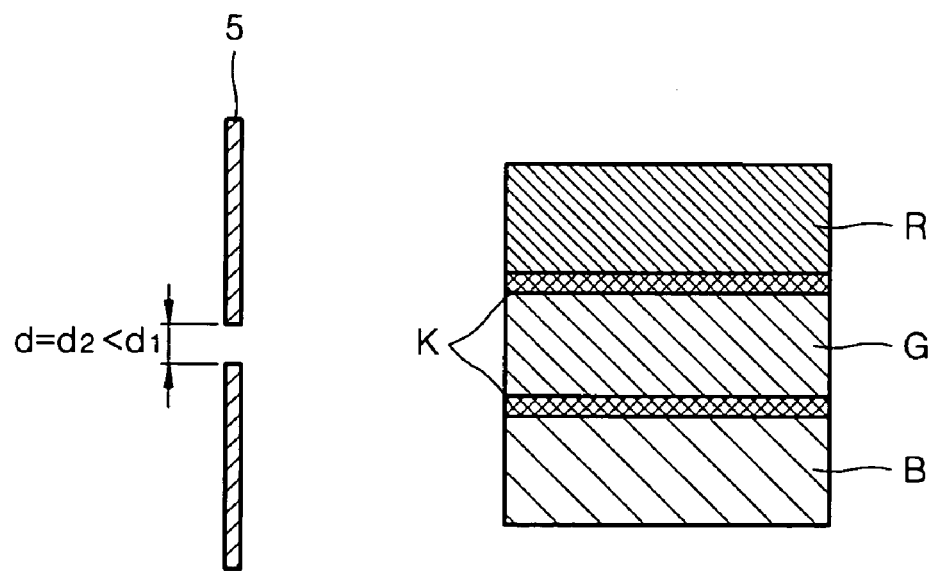
Figure 16C:
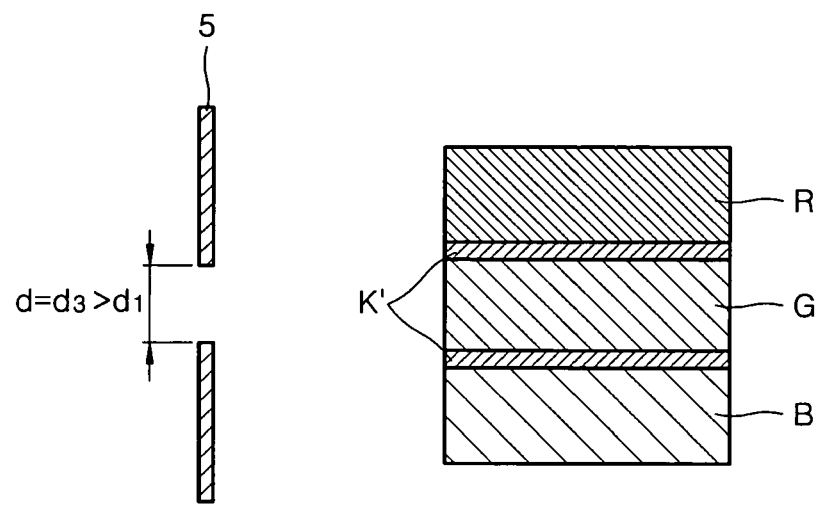

As the width of the slit formed in the spatial filter 5 varies, the widths of color bars vary. FIGS. 16A through 16C show color bars with widths, which vary according to the width d of the slit of the spatial filter 5 of the projection system of FIG. 4. In FIG. 16A, the slit width d is $d_1$, and R, G, and B bars are formed in corresponding color areas of the light valve 40. If the slit width d changes from $d_1$ to $d_2(d_2<d_1)$, black bars K are formed between adjacent color bars as illustrated in FIG. 16B. If the slit width d changes from $d_1$ to $d_3(d_3>d_1)$, the R, G, and B bars are enlarged such that overlapping portions K' are formed between adjacent color bars as illustrated in FIG. 16C.

The scrolling of color bars formed on the light valve 40 will now be described with reference to FIGS. 17A through 17C. It is assumed that the scrolling unit 20 rotates in the direction indicated by an arrow as shown in FIG. 12.

Figure 17A:
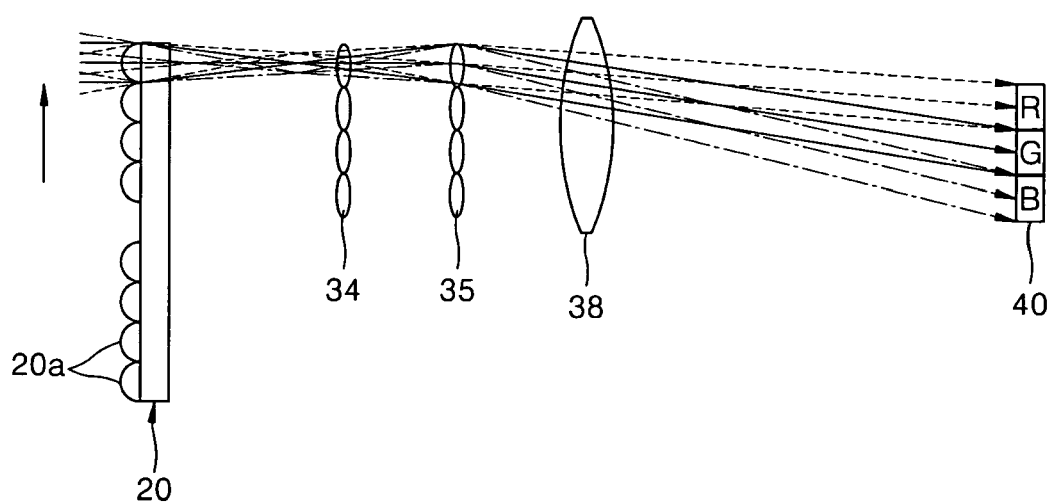
FIGS. 17A through 17C illustrate color scrolling that occurs in the projection system of FIG. 4.
Figure 17B:
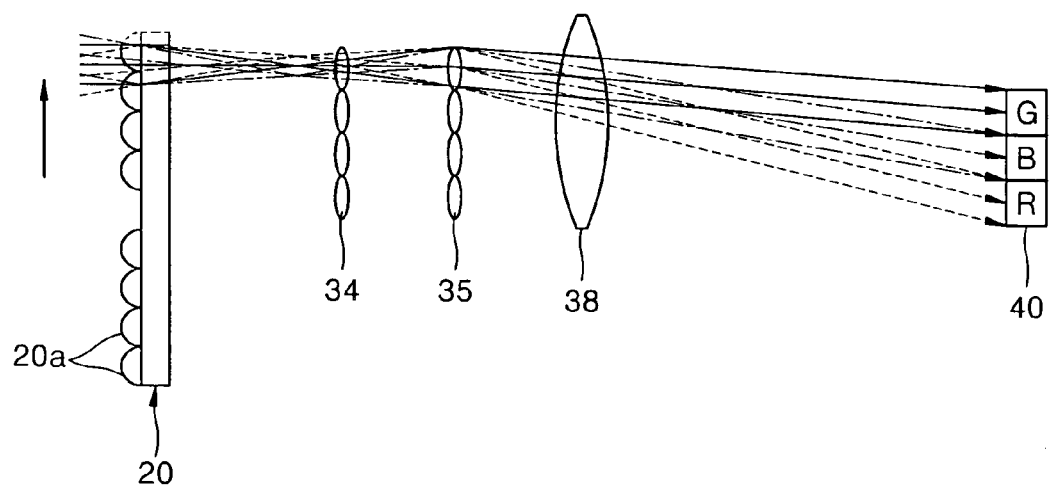
Figure 17C:
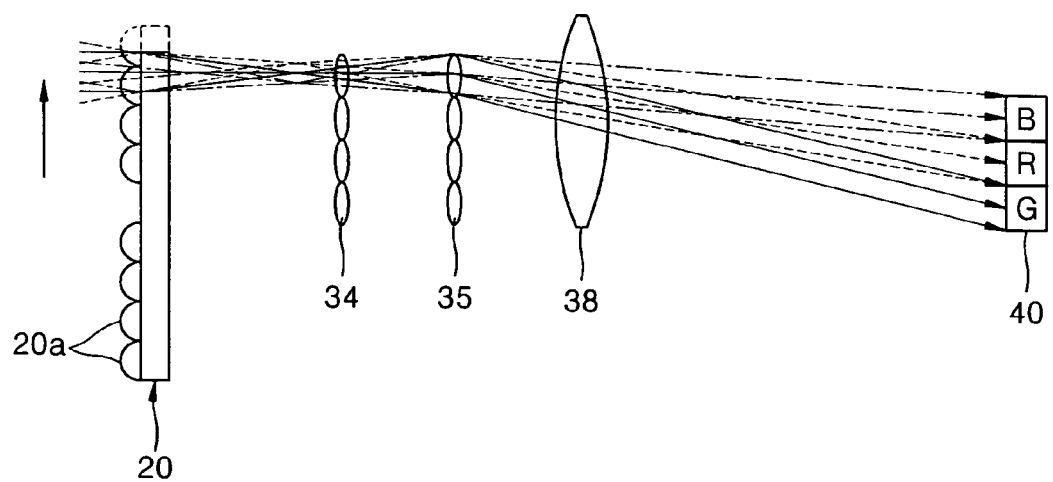

First, as illustrated in FIG. 17A, the R, G, and B beams produced by the color separator 15 are incident upon each of the lens cells 20a of the scrolling unit 20. After passing through the first and second fly-eye lens arrays 34 and 35 and the relay lens 38, the R, G, and B beams are incident on corresponding color areas of the light valve 40. Hence, R, G, and B color bars are formed on the light valve 40. The first and second fly-eye lens arrays 34 and 35 and the relay lens 38 focus incident color beams onto corresponding color areas of a light valve. First, the R, G, and B beams pass through the scrolling unit 20, the first and second fly-eye lens arrays 34 and 35, and the relay lens 38, and color bars are formed on the light valve 40 in a predetermined order, for example, in an order of R, G, and B. Next, the scrolling unit 20 rotates and the lens surface of the scrolling unit 20 gradually moves upward while the color beams pass through the scrolling unit 20. Accordingly, the focal points of the color beams passing through the scrolling unit 20 vary as the scrolling unit 20 moves, and color bars in an order of G, B, and R are formed, as illustrated in FIG. 17B. Then, the scrolling unit 20 rotates, the incident color beams are scrolled, and color bars in an order of B, R, and G are formed as illustrated in FIG. 17C. In other words, the locations of the lenses of the scrolling unit 20 upon which beams are incident change according to the rotation of the scrolling unit 20, and the rotation of the scrolling unit 20 causes a rectilinear motion of an area of a lens array of the scrolling unit 20 through which light passes so that scrolling is performed. Such scrolling is repeated periodically.

Color lines are formed on each of the lens cells 20a of the scrolling unit 20, and likewise, color lines are formed on each of the lens cells of the first fly-eye lens array 34. Preferably, but not necessarily, lens cells 20a of the scrolling unit 20 through which light passes are matched with lens rows of each of the first and second fly-eye lens arrays 34 and 35 in a one-to-one correspondence. In other words, if the number of lens cells 20a occupied by light passing through the scrolling unit 20 is 4, each of the first and second fly-eye lens arrays 34 and 35 preferably, but not necessarily, has 4 lens rows.

The number of lens cells 20a of the scrolling unit 20 can be set to synchronize the scrolling unit with the operating frequency of the light valve 40. That is, the higher the operating frequency of the light valve 40, the more lens cells 20a are included in the scrolling unit 20 so that the scrolling speed can be increased while maintaining a constant rotation speed of the scrolling unit 20. Alternatively, the scrolling unit 20 can be synchronized with the operating frequency of the light valve 40 by controlling the rotation speed of the scrolling unit 20 while maintaining a constant number of the lens cells 20a of the scrolling unit 20.

Although an example where the scrolling unit 20 is a single spiral lens disk on which a plurality of cylindrical lens cells 20a are spirally arranged has been described above, various modifications can be made to the entire shape of the scrolling unit 20 as long as the rotation of the scrolling unit 20 causes a rectilinear motion of an area of a lens array of the scrolling unit 20 through which light passes so that color scrolling is performed. Hence, as illustrated in FIG. 13, the scrolling unit 20 may include a plurality of spiral lens disks.

As described above, in an apparatus consistent with the present invention, a single scrolling unit can handle all colors without the need to install a separate scrolling unit for each individual color. Thereby, a projection system can be made compact.

Also, scrolling is performed by rotating the scrolling unit in one direction, without changing the rotation direction, thereby achieving continuous, consistent scrolling. Further, since the single scrolling unit is used to scroll all color beams, the speeds of all of the color bars are identical. Thus, the synchronization of the color bars is easily controlled.

Figure 18:
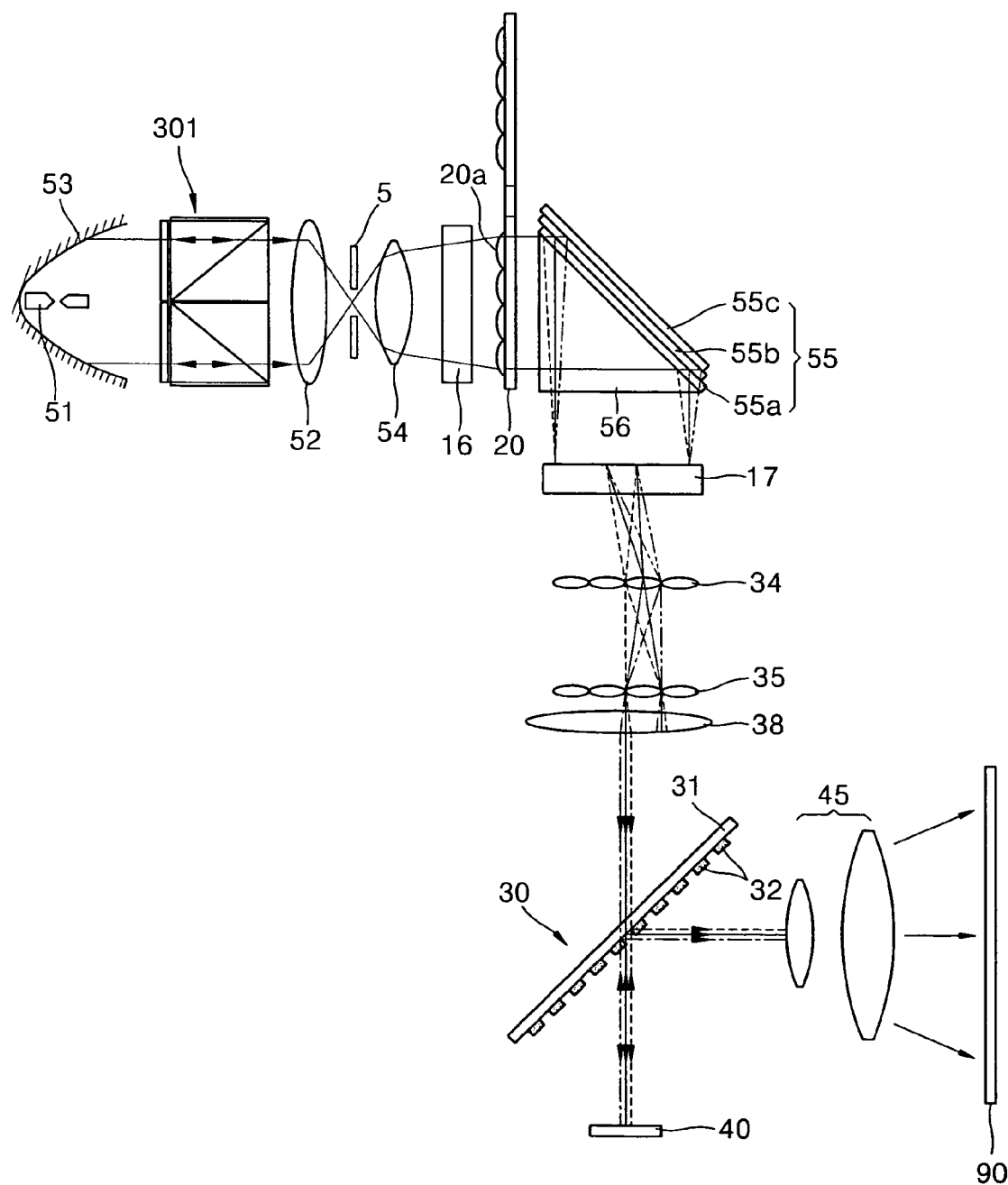
FIG. 18 is a schematic diagram of a projection system according to a second embodiment of the present invention.

FIG. 18 is a schematic diagram of a projection system according to a second embodiment of the present invention. Referring to FIG. 18, the projection system according to the second embodiment of the present invention includes a light source 51, a PCS 301, a reflection mirror 53, a scrolling unit 20, a color separator 55, a light valve 40, and a projection lens unit 45. The PCS 301 performs polarization conversion to output a beam having a single polarization. The reflection mirror 53 reflects a light beam that is emitted from the light source 51 or received from the PCS 301 toward the PCS 301. The scrolling unit 20 rotates and scrolls a light beam transmitted by the PCS 301. The color separator 55 separates a light beam transmitted by the scrolling unit 20 according to color. The light valve 40 processes the beam transmitted by the color separator 55, according to an image signal, and forms a picture. The projection lens unit 45 magnifies the picture formed by the light valve 40 and projects the magnified picture onto the screen 90. The PCS 301 may be replaced by one of the PCSs 302 through 307 of FIGS. 6 through 11.

A focusing lens 52, a spatial filter 5, and a collimating lens 54 are sequentially arranged on a light path between the PCS 301 and the scrolling unit 20. Since the functions of the focusing lens 52, the spatial filter 5, and the collimating lens 54 have been described above, they will not be described again here.

The first cylindrical lens 16 that reduces the width of a light beam incident upon the scrolling unit 20 is disposed in front of the scrolling unit 20.

Referring to FIG. 12, the scrolling unit 20 may be a single spiral lens disk on which at least one cylindrical lens cell 20a is spirally arranged. Alternatively, referring to FIG. 13, the scrolling unit 20 may include first and second spiral lens disks 26 and 27 and a glass rod 28. Since the principle of scrolling incident light by rotation of the scrolling unit 20 has been described above, it will not be described again here.

The color separator 55 includes first, second, and third dichroic filters 55a, 55b, and 55c which transmit or reflect incident light according to color. The first, second, and third dichroic filters 55a, 55b, and 55c are disposed parallel to one another. Rays included in a light beam incident upon the scrolling unit 20 are transmitted at different angles according to different locations on each of the cylindrical lens cells 20a upon which the rays are incident. The light beam rays are reflected by the first, second, or third dichroic filter 55a, 55b, or 55c such that the light beam is separated according to color. Also, in contrast with the projection system of FIG. 4, a prism 56 is further included between the scrolling unit 20 and the color separator 55 such that an incident light is transferred to the color separator 55 without a change in the path of the light.

A second cylindrical lens 17, first and second fly-eye lens arrays 34 and 35, a relay lens 38, and a wire grid PBS 30 are sequentially arranged on the light path between the color separator 55 and the light valve 40. The second cylindrical lens 17 widens the beam narrowed by the first cylindrical lens 16 to a beam with the original width. Since the first and second fly-eye lens arrays 34 and 35, the relay lens 38, and the wire grid PBS 30 have been described above, they will not be described again here in detail.

The light valve 40 processes the light transmitted by the wire grid PBS 30 according to an image signal and forms a color picture. Preferably, but not necessarily, the light valve 40 is a reflective liquid crystal display. The polarization direction of the beam transmitted by the wire grid PBS 30 is changed by modulation of each of the cells of the light valve 40, and the resultant beam re-enters the wire grid PBS 30 and is reflected thereby toward the projection lens unit 45.

The projection lens unit 45 magnifies the picture formed by the light valve 40 and reflected by the wire grid PBS 30 and projects the magnified picture onto the screen 90.

Figure 19:
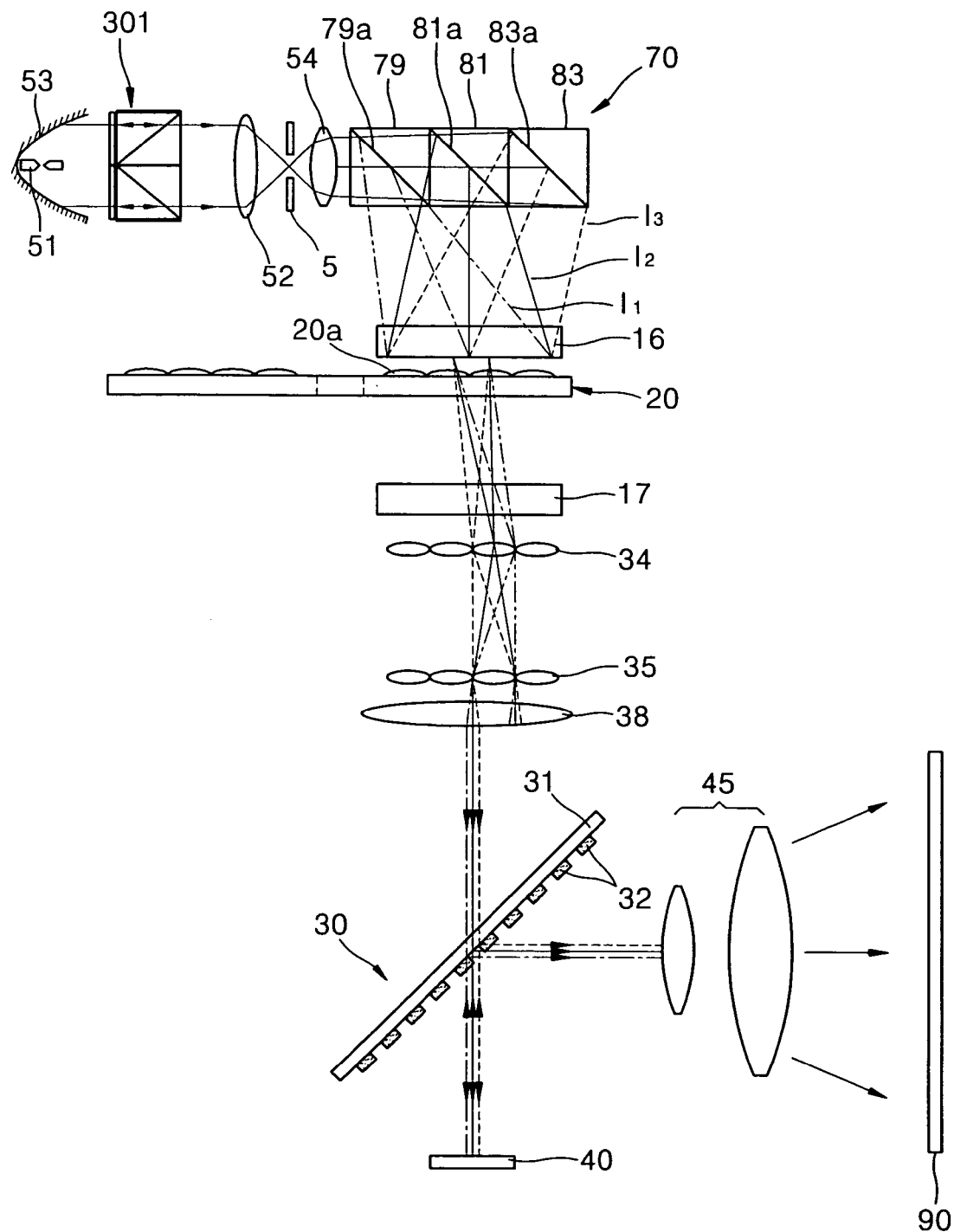
FIG. 19 is a schematic diagram of a projection system according to a third embodiment of the present invention.

FIG. 19 is a schematic diagram of a projection system according to a third embodiment of the present invention. Since the projection systems according to the first and third embodiments of the present invention are identical except that an optical pipe 70 is used as a color separator in the third embodiment of the present invention, only the optical pipe 70 will be described here in detail.

Referring to FIG. 19, the optical pipe 70 includes first, second, and third dichroic prisms 79, 81, and 83, each of which reflects a beam in a specific wavelength range and transmits beams in all other wavelength ranges such that light incident upon the optical pipe 70 is separated into first, second, and third color beams $I_1$, $I_2$, and $I_3$.

The first dichroic prism 79 includes a first dichroic filter 79a, which reflects a first color beam $I_1$ of the incident beam and transmits second and third color beams $I_2$, and $I_3$. For example, the first dichroic filter 79a can reflect an R beam and transmit G and B beams.

The second dichroic prism 81 is attached to the first dichroic prism 79 and includes a second dichroic filter 81a. The second dichroic filter 81a reflects the second color beam $I_2$, for example, the G beam, and transmits the first and third color beams $I_1$ and $I_3$, for example, the R and B beams.

The third dichroic prism 83 is attached to the second dichroic prism 81 and includes a third dichroic filter 83a. The third dichroic filter 83a reflects the third color beam $I_3$, for example, the B beam, and transmits the first and second color beams $I_1$ and $I_2$, for example, the R and G beams. The third dichroic filter 83a may be replaced by a total reflection mirror which reflects the entire incident beam.

The light emitted from the light source 51 is separated into beams of different colors by the optical pipe 70 with the above-described configuration, and the beams of different colors are directed toward the scrolling unit 20.

As described above, a projection system consistent with the present invention has the following effects. First, a PCS efficiently transmits light emitted from a light source, thereby increasing the light efficiency of the projection system. The projection system can be simplified.

Second, instead of including a plurality of scrolling units for individual colors, a single scrolling unit that handles all color beams is included, thereby reducing the size of the projection system.

Third, scrolling is performed by rotating the scrolling unit in one direction without changing the rotation direction, thereby achieving continuous, consistent scrolling. Also, because the single scrolling unit is used to scroll all color bars, the color bars can be scrolled at an equal speed. Thus, synchronization of the color bars is easily controlled.

Fourth, the contrast of a color picture can be improved by installing a wire grid PBS in front of a light valve. Further, because the wire grid PBS is disposed such that wire grids of the wire grid PBS face the light valve, a beam emitted from the light valve does not pass through a glass substrate of the wire grid PBS, thereby preventing occurrences of astigmatism.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A projection system comprising:
   a light source;
   a polarization conversion system having an incidence plane through which light emitted from the light source enters, which transmits a first polarized beam from the incident light and reflects a second polarized beam toward the incidence plane and changes the polarization of the second polarized beam;
   a reflection mirror which reflects the beam emitted from the incidence plane of the polarization conversion system and the light emitted from the light source toward the incidence plane;
   a color separator which separates an incident beam according to color;
   a scrolling unit including at least one lens cell, which converts a rotation of the lens cell into a rectilinear motion of an area of the lens cell through which light passes so that the incident beam is scrolled;
   a light valve which processes a beam transmitted by the color separator and the scrolling unit according to an image signal and forms a color picture; and
   a projection lens unit which magnifies the color picture formed by the light valve and projects the magnified color picture onto a screen;
   wherein the scrolling unit includes first and second spiral lens disks, which are disposed apart from each other and each includes at least one cylindrical lens cell that is spirally arranged, and a glass rod installed between the first and second spiral lens disks.

2. The projection system of claim 1, wherein the polarization conversion system comprises:
   a polarization beam splitter including a polarization filter which reflects the second polarized beam and transmits the first polarized beam;
   a reflection member which reflects the second polarized beam reflected by the polarization filter toward the polarization filter such that the polarization filter reflects the second beam toward the incidence plane of the polarization convention system; and
   a wavelength plate installed between the reflection mirror and the polarization beam splitter, which changes the polarization of a beam that passes through the wavelength plate.

3. The projection system of claim 2, wherein the wavelength plate is a ¼ wavelength plate that covers the entire area of the incidence plane of the polarization conversion system.

4. The projection system of claim 2, wherein the wavelength plate is a ½ wavelength plate that covers half of the incidence plane of the polarization conversion system.

5. The projection system of claim 1, wherein the polarization conversion system comprises:

a polarization beam splitter including first and second polarization filters, the first and second polarization filters transmitting the first polarized beams and reflecting the second polarized beams;

first and second reflection members which respectively reflect the second polarized beams reflected by the first and second polarization filters toward the first and second polarization filters such that the first and second polarization filters reflect the second beams toward the incidence plane of the polarization conversion system; and a wavelength plate installed between the reflection mirror and the polarization beam splitter, which changes the polarization of a beam that passes through the wavelength plate.

6. The projection system of claim 5, wherein the wavelength plate is a ¼ wavelength plate that covers the entire area of the incidence plane of the polarization conversion system.

7. The projection system of claim 5, wherein the wavelength plate is a ½ wavelength plate that covers half of the incidence plane of the polarization conversion system.

8. The projection system of claim 1, wherein the polarization conversion system comprises:

a polarization beam splitter including first and second polarization filters, the first and second polarization filters transmitting the first polarized beams and the first polarization filter reflecting the second polarized beam toward the second polarization filter and the second polarization filter reflecting the second polarized beam toward the first polarization filter; and a wavelength plate located between the reflection mirror and the polarization beam splitter, which changes the polarization of a beam that passes through the wavelength plate.

9. The projection system of claim 8, wherein the wavelength plate is a ¼ wavelength plate that covers the entire area of the incidence plane of the polarization conversion system.

10. The projection system of claim 8, wherein the wavelength plate is a ½ wavelength plate that covers half of the incidence plane of the polarization conversion system.

11. The projection system of claim 1, wherein the polarization conversion system comprises:

a polarization beam splitter which is located in one half of a region adjacent to an optical axis and includes a polarization filter which transmits the first polarized beam and reflects the second polarized beam;

a first reflection member which reflects the second polarized beam reflected by the polarization beam splitter toward the polarization filter such that the polarization filter reflects the second polarized beam toward the incidence plane of the polarization convention system; and a wavelength plate installed between the reflection mirror and the polarization beam splitter, which changes the polarization of an incident beam.

12. The projection system of claim 11, wherein the wavelength plate is a ¼ wavelength plate.

13. The projection system of claim 1, wherein the reflection mirror is a parabolic reflection mirror.

14. The projection system of claim 1, wherein the color separator includes first, second, and third dichroic filters, which are disposed between the light source and the scrolling unit at different angles and each transmits a beam of a color and reflects beams of all other colors.

15. The projection system of claim 1, wherein the color separator includes first, second, and third dichroic prisms, which are sequentially attached to one another between the light source and the scrolling unit, and the first, second, and third dichroic prisms respectively include first, second, and third dichroic filters, each of which transmits a beam of a color and reflects beams of all other colors.

16. The projection system of claim 1, wherein the color separator includes first, second, and third dichroic filters, which are disposed in parallel between the scrolling unit and the light valve and each transmits a beam of a color and reflects beams of all other colors.

17. The projection system of claim 16, further comprising a prism installed in front of the color separator.

18. The projection system of claim 1, further comprising a focusing lens disposed between the light source and the scrolling unit, which focuses light emitted from the light source.

19. The projection system of claim 1, further comprising a spatial filter disposed between the light source and the scrolling unit, which controls a divergence angle of the light emitted from the light source.

20. The projection system of claim 1, further comprising a collimating lens disposed on a light path between the light source and the scrolling unit, which collimates incident light.

21. The projection system of claim 1, further comprising first and second cylindrical lenses which are respectively disposed in front of and behind the scrolling unit.

22. The projection system of claim 1, further comprising first and second fly-eye lens arrays which are sequentially disposed on a light path between the scrolling unit and the light valve.

23. The projection system of claim 22, further comprising a relay lens which is disposed on a light path between the second fly-eye lens array and the light valve.

24. The projection system of claim 1, further comprising a polarization beam splitter disposed on a light path between the scrolling unit and the light valve, which transmits the first polarized beam and reflects the second polarized beam, wherein the projection lens unit magnifies a color picture that is formed by the light valve and reflected by the polarization beam splitter and projects the magnified color picture to the screen.

25. The projection system of claim 24, wherein the light valve is a reflective liquid crystal display.

26. The projection system of claim 24, wherein the polarization beam splitter includes a substrate and wire grids, which are formed on one surface of the substrate, and the polarization beam splitter is disposed such that the wire grids face the light valve.

* * * * *